US012739104B2

(12) United States Patent
Li et al.

(10) Patent No.: US 12,739,104 B2
(45) Date of Patent: Sep. 15, 2026

(54) DATA PROCESSING METHOD AND APPARATUS, ELECTRONIC DEVICE, AND STORAGE MEDIUM

(71) Applicant: MaShang Consumer Finance Co., Ltd., Chongqing (CN)

(72) Inventors: Tong Li, Chongqing (CN); Ning Jiang, Chongqing (CN); Linchengxi Zeng, Chongqing (CN); Xiaoyu Du, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 2 days.

(21) Appl. No.: 18/774,752

(22) Filed: Jul. 16, 2024

(65) Prior Publication Data

US 2024/0372706 A1 Nov. 7, 2024

(30) Foreign Application Priority Data

Jul. 25, 2023 (CN) ......................... 202310924706.6

(51) Int. Cl.
*H04L 29/06* (2006.01)
*H04L 9/08* (2006.01)

(52) U.S. Cl.
CPC .......... *H04L 9/0838* (2013.01); *H04L 9/0822* (2013.01)

(58) Field of Classification Search
CPC . H04L 9/0838; H04L 9/0822; H04L 63/0428; H04L 9/008; H04L 63/0435
See application file for complete search history.

(56) References Cited

U.S. PATENT DOCUMENTS 8,837,742 B2 * 9/2014 Liu ....................... H04L 9/0819 380/283
9,158,925 B2 * 10/2015 Kamara .................. G06F 21/60
(Continued)

FOREIGN PATENT DOCUMENTS

| CN | 107196918 A | 9/2017 |
|---|---|---|
| CN | 107196919 A | 9/2017 |
| CN | 109241016 A | 1/2019 |

OTHER PUBLICATIONS

The State Intellectual Property Office of People's Republic of China, "First Office Action" in Application No. 202310924706.6, Sep. 30, 2025, 12 pages.
(Continued)

*Primary Examiner* — Yogesh Paliwal
(74) *Attorney, Agent, or Firm* — Davis Wright Tremaine LLP

(57) ABSTRACT

Embodiments of the present application provide a data processing method and apparatus, an electronic device, and a storage medium. The data processing method, applied to a first participating node, includes: encrypting plaintext service data based on an encryption key array to obtain a ciphertext data set, where the ciphertext data set includes ciphertext service data, and different participating member nodes use a same encryption key array; sending the ciphertext data set to a central node; and acquiring a data comparison result generated by the central node, where the data comparison result is obtained by performing data comparison based on ciphertext service data in ciphertext data sets of the participating member nodes.

17 Claims, 6 Drawing Sheets

(56) References Cited

U.S. PATENT DOCUMENTS

| | | | | |
|---|---|---|---|---|
| 2003/0081769 | A1* | 5/2003 | Hamilton | H04N 1/32144 380/28 |
| 2007/0055877 | A1* | 3/2007 | Persson | H04L 63/0823 713/173 |
| 2011/0211701 | A1* | 9/2011 | Grall | H04L 9/0844 380/283 |
| 2013/0246802 | A1* | 9/2013 | Kerschbaum | H04L 9/00 713/189 |
| 2018/0089454 | A1 | 3/2018 | Iyer et al. | |
| 2021/0091946 | A1* | 3/2021 | Yoshida | H04L 9/16 |
| 2023/0113896 | A1* | 4/2023 | Milazzo | H04L 9/085 713/164 |

OTHER PUBLICATIONS

Wang et al., "Privacy-preserving Decentralized Parameter Estimation in Edge Com-puting Networks", AIIPCC 2021, Jun. 26-28, 2021, Hangzhou, China, 8 pages.

Tong et al., "Information Sharing and Secure Multi-party Computing Model Based on Blockchain", School of Communication Engineering, Xidian University, China Academic Journal Electronic Publishing House, 2019, 11 pages.

* cited by examiner

DATA PROCESSING METHOD AND APPARATUS, ELECTRONIC DEVICE, AND STORAGE MEDIUM

CROSS-REFERENCE TO RELATED APPLICATION

This application claims priority to Chinese Patent Application No. 202310924706.6, filed on Jul. 25, 2023, which is hereby incorporated by reference in its entirety.

TECHNICAL FIELD

The present application relates to the field of internet technology and, in particular, to a data processing method and apparatus, an electronic device, and a storage medium.

BACKGROUND

At present, for a horizontal alliance with two or more participants (such as enterprises, merchants, etc.), it is typically necessary to calculate common service data (such as common user list, common commodity information, etc.) between the two or more participants based on the participants' respective service data, or to calculate a volume of the common service data between the participants, where the service data generally includes privacy data with high security requirements (such as user privacy data), that is, an application scenario involving an intersection of the privacy data.

For example, it is necessary to calculate a common member user list of two or more participants based on participants' respective member user lists, so that joint marketing can be achieved based on the common member user list. For another example, it is necessary to calculate a common block user list of two or more participants based on participants' respective block user lists, so that risk control can be accomplished based on the common block user list.

SUMMARY

In a first aspect, an embodiment of the present application provides a data processing method applied to a central node, where the method includes:

acquiring ciphertext data sets sent by participating member nodes, where a ciphertext data set includes ciphertext service data, where the ciphertext service data is obtained by encrypting plaintext service data based on an encryption key array, and different participating member nodes use a same encryption key array, and where the participating member nodes include a first participating member node; and performing data comparison on the ciphertext service data in the ciphertext data sets to obtain a data comparison result of the first participating member node.

In a second aspect, an embodiment of the present application provides a data processing method applied to a first participating member node, where the method includes:

encrypting plaintext service data based on an encryption key array to obtain a ciphertext data set, where the ciphertext data set includes ciphertext service data, and different participating member nodes use a same encryption key array;

sending the ciphertext data set to a central node; and acquiring a data comparison result generated by the central node, where the data comparison result is obtained by performing data comparison based on ciphertext service data in ciphertext data sets of the participating member nodes.

In a third aspect, an embodiment of the present application provides a data processing apparatus arranged at a central node, where the apparatus includes:

a data acquiring module, configured to acquire ciphertext data sets sent by participating member nodes, where a ciphertext data set includes ciphertext service data, and the ciphertext service data is obtained by encrypting plaintext service data based on an encryption key array, and where different participating member nodes use a same encryption key array, and the participating member nodes include a first participating member node; and a data comparing module, configured to perform data comparison on the ciphertext service data in the ciphertext data sets to obtain a data comparison result of the first participating member node.

In a fourth aspect, an embodiment of the present application provides a data processing apparatus arranged at a first participating member node, where the apparatus includes:

a data encrypting module, configured to encrypt plaintext service data based on an encryption key array to obtain a ciphertext data set, where the ciphertext data set includes ciphertext service data, and different participating member nodes use a same encryption key array;

a data sending module, configured to send the ciphertext data set to a central node; and a result acquiring module, configured to acquire a data comparison result generated by the central node, where the data comparison result is obtained by performing data comparison based on ciphertext service data in ciphertext data sets of the participating member nodes.

In a fifth aspect, an embodiment of the present application provides an electronic device including:

a processor; and a memory arranged to store computer executable instructions, where the executable instructions are configured to be executed by the processor, and where the executable instructions include steps for performing the method as described in the first aspect or the second aspect.

In a sixth aspect, an embodiment of the present application provides a computer readable storage medium configured to store computer executable instructions, where the executable instructions cause a computer to execute steps in the method as described in the first aspect or the second aspect.

In embodiments of the present application, a central node first acquires ciphertext data sets sent by participating member nodes, ciphertext data sets of different participating member nodes are obtained by encrypting plaintext service data generated by each participating member node using a same encryption key array, and the participating member nodes include a first participating member node; then, data comparison is performed on ciphertext service data in the ciphertext data sets to obtain a data comparison result of the first participating member node; next, the first participating member node could acquire the data comparison result from the central node, and then determine common service data of a participating member node combination based on the acquired data comparison result.

BRIEF DESCRIPTION OF DRAWINGS

In order to more clearly illustrate technical solutions of the embodiments of the present application or the prior art, drawings to be used in the description of the embodiments or the prior art will be briefly introduced below. Obviously, the drawings in the following description are intended for one or more of some embodiments recorded in the present application, and for those ordinarily skilled in the art, other drawings may be obtained based on these drawings without creative efforts.

DESCRIPTION OF EMBODIMENTS

Figure 1:
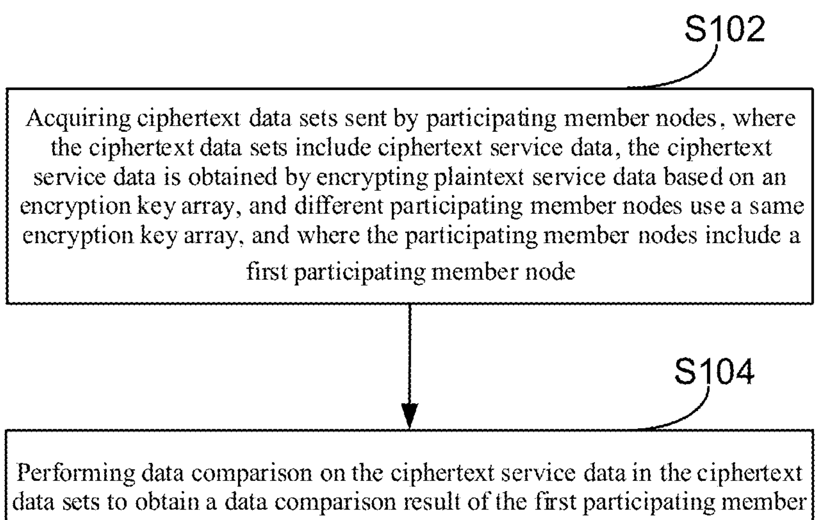
FIG. 1 is a first schematic flowchart of a data processing method applied to a central node according to an embodiment of the present application.

In order to enable those skilled in the art to better understand one or more technical solutions in the present application, the technical solution(s) in the present application will be clearly and comprehensively described in connection with the drawings in the present application. Apparently, the described embodiments are merely part of embodiments of the present application, rather than all embodiments. Based on the embodiments in the present application, all other embodiments obtained by one of ordinary skill in the art without paying creative efforts belong to the protection scope of the present application.

It should be noted that, in case of no conflict, one or more embodiments in the present application and the features in the embodiments can be combined with each other. Embodiments of the present application will be described in detail with reference to drawings and in combination with embodiments.

In an existing process for determining common service data, two or more participants need to intercommunicate all service data, in this way, there might be a leakage of non-common service data between participants (for example, participant A and participant B, participant A will get participant B's service data that participant A does not have, and participant B will get participant A's service data that participant B does not have), hence the security of service data cannot be ensured among participants.

One or more embodiments of the present application provide a data processing method and apparatus, an electronic device, and a storage medium. Considering that two or more participants need to intercommunicate service data if a process for determining common service data between the two or more participants is performed by participants, each participant can determine common service data between itself and other participants through service data comparison; since a certain participant can also acquire non-common service data between the participant itself and other participants, there may be security problems of service data; moreover, considering that in order to improve the security of service data, forged service data needs to be added for the purpose of mixing-up if common service data between multiple participants is obtained by performing intersection processing on service data of the participants based on the existing oblivious transfer technology, not only real service data needs to be performed with intersection, but also forged service data needs to be performed intersection, which definitely will increase the amount of data processing of the intersection process and lead to low data processing efficiency; in addition, if common service data of a certain preset participant combination is obtained in such a manner that a plurality of participants in the preset participant combination exchange their respective ciphertext data sets therebetween and the participants perform intersection processing based on the respective ciphertext data sets and ciphertext data sets transmitted by other participants in the preset participant combination, since the plurality of participants in the preset participant combination are fixed, there definitely would be a problem that the common service data is determined with poor flexibility, which cannot meet personalized requirements of different participating member nodes to determine common service data of any participant combination. Based on the above problems, according to the present technical solution, in one aspect, since ciphertext service data is obtained by encrypting with a same encryption key array, and if two pieces of ciphertext service data are the same, corresponding two pieces of plaintext service data are also the same, so a central node can directly compare ciphertext service data of different participating member nodes to obtain a data comparison result of a first participating member node, and based on the data comparison result, then a determination can be made on which same plaintext service data (i.e., common service data) is included between the participating member nodes, in this way, since the data comparison process is uniformly executed by the central node, service data will not be intercommunicated between the participating member nodes, and the central node directly performs data comparison based on the ciphertext service data without decrypting the ciphertext service data, so there is no need to acquire a corresponding data decryption key, that is, the service data in the data comparison process exists in a form of ciphertext, thereby ensuring the security of service data in the whole data processing process. In another aspect, a data comparison result obtained by each participating member node from the central node could only contain data comparison sub-results related to respective ciphertext service data of the participating member node, for a case that the data comparison sub-results contain service data, the service data is also generated by the participating member node itself and exists in a form of ciphertext, in the whole data processing process, only the central node can acquire all ciphertext service data, since the central node cannot obtain a data decryption key, there is no need to add forged service data for the purpose of mixing-up, so the volume of ciphertext service data used in the data comparison process will not be increased, thereby improving the data processing efficiency of the whole process. In yet another aspect, since the data comparison result generated by the central node could include data comparison sub-results, and each data comparison sub-result could include a correspondence relationship between any piece of ciphertext service data of the first participating member node and a plurality of second participating member nodes holding the ciphertext service data, rather than being specific to which common service data is held by a certain preset participating member node combination, therefore, the first participating member node could determine common service data of any designated participating member node combination based on the data comparison sub-results of the ciphertext service data (i.e., a data comparison result obtained by executing a data comparison task once), where the designated participating member node combination could include a node combination obtained from all combinations between the first participating member node and other participating member nodes, thus, the first participating member node could, according to actual requirements, determine which common service data is specifically contained for any participating member node combination expected to be known, to improve the flexibility of determining common service data and meet personalized requirements of different participating member nodes for determining common service data of any node combination.

The embodiments of the present application aim to provide a data processing method and apparatus, an electronic device, and a storage medium, capable of ensuring the security of service data of participating member nodes.

In order to implement the above technical solution, the embodiments of the present application are described as follows.

FIG. 1 is a first schematic flowchart of a data processing method according to one or more embodiments of the present application, the method in FIG. 1 can be executed by a central node, and the central node could be a terminal device or a designated server; as shown in FIG. 1, the method at least includes the following steps.

At S102, ciphertext data sets sent by participating member nodes are acquired, where the ciphertext data sets include ciphertext service data, the ciphertext service data is obtained by encrypting plaintext service data based on an encryption key array, different participating member nodes use a same encryption key array, and the participating member nodes include a first participating member node.

Specifically, there could be n participating member nodes, there could be K pieces of ciphertext service data in the ciphertext data sets, each of n and K is an integer greater than 1, the n participating member nodes could belong to a Horizontal Alliance, and the n participating member nodes could be n merchants or n enterprises with a preset association relation. An example is taken where the value of n is 5, for example, the n participating member nodes include participating member node 1 to participating member node 5. The central node receives ciphertext data set 1 sent by participating member node 1, ciphertext data set 2 sent by participating member node 2, ciphertext data set 3 sent by participating member node 3, ciphertext data set 4 sent by participating member node 4 and ciphertext data set 5 sent by participating member node 5. That is to say, the central node acquires ciphertext data sets sent by the n participating member nodes respectively, that is, the number of ciphertext data sets acquired by the central node is n, for example, the number of ciphertext data sets acquired by the central node is 5.

Specifically, the encryption key array could include a plurality of data encryption keys which may be generated by the central node or the participating member nodes. For the ciphertext data set 1 sent by the participating member node 1, the ciphertext data set 1 is obtained by the participating member node 1 by encrypting the plaintext data set 1 (i.e., including K pieces of plaintext service data 1) generated by the participating member node 1 based on the encryption key array; for the ciphertext data set 2 sent by the participating member node 2, the ciphertext data set 2 is obtained by the participating member node 2 by encrypting the plaintext data set 2 (i.e., including K pieces of plaintext service data 2) generated by the participating member node 2 based on the encryption key array; by analogy, details will not be repeated here.

For example, the plaintext data set could be user list plaintext data, the user list plaintext data includes K pieces of plaintext user information (i.e., plaintext service data, for example, user unique identification such as identity numbers or mobile phone numbers before encrypting), and the ciphertext data set could be user list ciphertext data, the user list ciphertext data includes K pieces of ciphertext user information (i.e., ciphertext service data, for example, user unique identification such as identity numbers or mobile phone numbers after encrypting). For another example, the plaintext data set could be commodity list plaintext data, the commodity list plaintext data includes K pieces of plaintext commodity information (i.e., plaintext service data, such as at least one of commodity code, commodity price and commodity model before encrypting), and the ciphertext data set could be commodity list ciphertext data, the commodity list ciphertext data includes K pieces of ciphertext commodity information (i.e., ciphertext service data, such as at least one of commodity code, commodity price and commodity model after encrypting).

It should be noted that plaintext data sets of different participating member nodes may contain a same amount of or different amounts of plaintext service data, that is, for different participating member nodes, K may remain a same value or different values, which is not limited in the present application.

At S104, data comparison is performed on the ciphertext service data in the ciphertext data sets to obtain a data comparison result of the first participating member node.

In some exemplary embodiments, the data comparison result could include common service data of the preset participating member node combination, that is, the central node directly determines which common service data is held by the preset participating member node combination, and the first participating member node acquires, from the central node, the common service data determined by the central node, in this way, since a plurality of participants in the preset participating member node combination are fixed, there definitely would be a problem that common service data is determined with poor flexibility, which cannot meet personalized requirements of different participating member nodes to determine common service data of any participating member node combination. In other exemplary embodiments, the data comparison result could include K data comparison sub-results, which represent a set of second participating member nodes holding the ciphertext service data of the first participating member node, that is, the data comparison result acquired by the first participating member node from the central node is not specific to which common service data is held by a certain preset participating member node combination. Therefore, the first participating member node could determine common service data of any designated participating member node combination based on the data comparison sub-results corresponding to K pieces of ciphertext service data respectively (i.e., the data comparison result obtained by executing a data comparison task once), thus, the first participating member node could, according to actual requirements, determine which common service data is specifically contained for any participating member node combination expected to be known, to improve the flexibility of determining common service data and meet personalized requirements of different participating member nodes for determining common service data of any node combination.

Specifically, since the ciphertext service data is obtained by encrypting with a same encryption key array, if two pieces of ciphertext service data are the same, then the corresponding two pieces of plaintext service data are also the same, thus the central node can directly compare the ciphertext service data of different participating member nodes and search for participating member nodes to which the same ciphertext service data belongs, to determine a set of second participating member nodes corresponding to each piece of ciphertext service data. For ciphertext service data a, a set of second participating member nodes corresponding to the ciphertext service data a includes a plurality of second participating member nodes holding ciphertext service data a among n participating member nodes. Based on this, the set of second participating member nodes respectively corresponding to K pieces of ciphertext service data of the first participating member node is determined for the first participating member node.

Specifically, the first participating member node could be any one of n participating member nodes, in some exemplary embodiments, all participating member nodes are used as the first participating member node, and correspondingly, data comparison results respectively corresponding to the n participating member nodes are determined. In other exemplary embodiments, a part of participating member nodes are used as the first participating member node, and correspondingly, data comparison results respectively corresponding to the part of participating member nodes of the n participating member nodes are determined. Still, an example is taken where the n participating member nodes include participating member node 1 to participating member node 5, if all participating member nodes are used as the first participating member node, it is necessary to determine data comparison result 1 of participating member node 1, data comparison result 2 of participating member node 2, data comparison result 3 of participating member node 3, data comparison result 4 of participating member node 4 and data comparison result 5 of participating member node 5.

Specifically, for a case that the data comparison result includes K data comparison sub-results, S104 as described above for performing data comparison on the ciphertext service data in the ciphertext data sets to obtain a data comparison result of the first participating member node, specifically includes the following steps.

Step 1, performing data comparison on the ciphertext service data in the ciphertext data sets to determine data comparison sub-results of the ciphertext service data of the first participating member node, where the data comparison sub-results are used to represent a set of second participating member nodes, and where all participating member nodes in the set of second participating member nodes have the ciphertext service data of the first participating member node.

Step 2, obtaining a data comparison result of the first participating member node based on the data comparison sub-results.

Still, an example is taken where the n participating member nodes include participating member node 1 to participating member node 5, for the participating member node 1, if the ciphertext data set 1 includes ciphertext service data 11, ciphertext service data 12 and ciphertext service data 13, then the data comparison result 1 includes data comparison sub-result 11, data comparison sub-result 12 and data comparison sub-result 13. The data comparison sub-result 11 is used to represent a set of second participating member nodes 11 holding the ciphertext service data 11 among the n participating member nodes, that is, the data comparison sub-result 11 includes a corresponding relationship between the ciphertext service data 11 and the set of second participating member nodes 11, and the set of second participating member nodes 11 includes the node identifier (s) of the participating member node(s) holding the ciphertext service data 11. The data comparison sub-result 12 is used to represent a set of second participating member nodes 12 holding ciphertext service data 12 among the n participating member nodes. The data comparison sub-result 13 is used to represent a set of second participating member nodes 13 holding ciphertext service data 13 among the n participating member nodes. Based on this, data comparison results 2 to 5 respectively corresponding to the participating member nodes 2 to 5 are determined for the participating member nodes 2 to 5.

In a specific implementation, an example is taken where the ciphertext data set includes user list ciphertext data and the user list ciphertext data includes K pieces of ciphertext user information, a determining process of the data comparison result of the first participating member node could be as follows: performing user information comparison based on user list ciphertext data sent by the n participating member nodes respectively, to obtain a user information comparison result of the first participating member node in the n participating member nodes.

Specifically, the user information comparison result includes K user information comparison sub-results, and the user information comparison sub-results are used to represent a second set of participating member nodes holding ciphertext user information of the first participating member node. For example, for the participating member node 1, if user list ciphertext data 1 includes ciphertext user information 11, ciphertext user information 12 and ciphertext user information 13, then the user information comparison result 1 includes user information comparison sub-result 11, user information comparison sub-result 12 and user information comparison sub-result 13. The user information comparison sub-result 11 is used to represent a set of second participating member nodes 11 holding the ciphertext user information 11 among the n participating member nodes; the user information comparison sub-result 12 is used to represent a set of second participating member nodes 12 holding ciphertext user information 12 among the n participating member nodes, and the user information comparison sub-result 13 is used to represent a set of second participating member nodes 13 holding ciphertext user information 13 among the n participating member nodes.

Next, after the central node generates the data comparison result of the first participating member node based on the ciphertext data sets sent by the participating member nodes, the central node could determine common service data of a participating member node combination based on the data comparison result; alternatively, the first participating member node could first acquire the data comparison result from the central node, and then determine common service data of a participating member node combination based on the data comparison result. Specifically, for a process that the first participating member node acquires the data comparison result from the central node, it could be that the central node actively sends the data comparison result to the first participating member node after generating the data comparison result, that is, the central node sends the data comparison result to the first participating member node. It could also be that the data comparison result is acquired by the first participating member node from the central node, for example, the first participating member node first sends a comparison result acquiring request to the central node, and the central node sends the data comparison result of the first participating member node to the first participating member node upon reception of the comparison result acquiring request. No limitation is made in the present application, and both situations are within the protection scope of the present application.

For a case that the first participating member node determines common service data of a designated participating member node combination based on the data comparison sub-results, the data comparison result could include K data comparison sub-results, each data comparison sub-result represents a set of second participating member nodes having the ciphertext service data of the first participating member node, after the first participating member node acquires the data comparison result, target comparison sub-results containing node identifiers of individual participating member nodes in the designated participating member node combination are determined based on the K data comparison sub-results in the data comparison result, and the service data targeted by the target comparison sub-results is determined as common service data of the designated participating member node combination.

Specifically, the designated participating member node combination includes a first participating member node and at least one fifth participating member node without the first participating member node, that is, the fifth participating member node is any one of the n participating member nodes that is different from the first participating member node. Still, an example is taken where the n participating member nodes include participating member node 1 to participating member node 5, if any one of participating member node 1 to participating member node 5 is the first participating member node, then participating member node 1 acquires data comparison result 1 from the central node, participating member node 2 acquires data comparison result 2 from the central node, participating member node 3 acquires data comparison result 3 from the central node, participating member node 4 acquires data comparison result 4 from the central node and participating member node 5 acquires data comparison result 5 from the central node.

Specifically, for case that the data comparison result includes K data comparison sub-results representing the set of second participating member nodes that have the ciphertext service data of the first participating member node, for the participating member node 1, the participating member node 1 acquires the data comparison result 1 from the central node. Still, an example is taken where the data comparison result 1 include data comparison sub-result 11, data comparison sub-result 12 and data comparison sub-result 13, the participating member node 1 could determine common service data of any designated participating member node combination based on the data comparison sub-result 11, the data comparison sub-result 12 and the data comparison sub-result 13.

For example, the data comparison sub-result 11 could be represented as {ciphertext service data 11, a set of second participating member nodes 11}, and the set of second participating member nodes 11 could be represented as [10001, 10002, 10003], where 10001 represents a node identifier of participating member node 1, 10002 represents a node identifier of participating member node 2, and 10003 represents a node identifier of participating member node 3, that is, the participating member node 1, the participating member node 2 and the participating member node 3 all have the ciphertext service data 11, while participating member node 4 and participating member node 5 do not have the ciphertext service data 11. The above data comparison sub-result 12 could be represented as {ciphertext service data 12, a set of second participating member nodes 12}, and the set of second participating member nodes 12 could be represented as [10001, 10004, 10005], where 10004 represents a node identifier of participating member node 4 and 10005 represents a node identifier of participating member node 5, that is, participating member node 1, participating member node 4 and participating member node 5 all have the ciphertext service data 12, while participating member node 2 and participating member node 4 do not have the ciphertext service data 12. The data comparison sub-result 13 could be represented as {ciphertext service data 13, a set of second participating member nodes 13}, and the set of second participating member nodes 13 could be represented as [10001, 10003, 10004], that is, participating member node 1, participating member node 3 and participating member node 4 all have ciphertext service data 13, while participating member node 2 and participating member node 5 do not have ciphertext service data 13.

Therefore, if the designated participating member node combination includes the participating member node 1 and the participating member node 3, then common service data of the designated participating member node combination includes ciphertext service data 11 and ciphertext service data 13, that is, the sets of second participating member nodes 11, 12 and 13 simultaneously include the ciphertext service data 11 corresponding to the set of second participating member nodes 11 [10001, 10002, 10003] and the ciphertext service data 13 corresponding to the set of second participating member nodes 13 [10001, 10003, 10004], for the node identifiers of the participating member node 1 and the participating member node 3. If the designated participating member node combination includes participating member node 1 and participating member node 4, then the common service data of the designated participating member node combination includes ciphertext service data 12 and ciphertext service data 13, that is, the sets of second participating member nodes 11, 12 and 13 simultaneously include the ciphertext service data 12 corresponding to the set of second participating member nodes 12 [10001, 10004, 10005] and the ciphertext service data 13 corresponding to the set of second participating member nodes 13 [10001, 10003, 10004], for the node identifiers of the participating member node 1 and the participating member node 4. Based on this, the first participating member node could quickly determine the common service data of any designated participating member node combination based on the K data comparison sub-results.

That is to say, in the process of the first participating member node determining common service data of any designated participating member node combination based on the K data comparison sub-results, the sets of second participating member nodes containing the node identifiers of the respective participating member nodes in the designated participating member node combination are searched from the sets of second participating member nodes respectively corresponding to the K data comparison sub-results, and ciphertext data sets respectively corresponding to the searched sets of second participating member nodes are determined as the common service data of the designated participating member node combination. Correspondingly, if the ciphertext data set include user list ciphertext data, then the common service data is a common user list of respective participating member nodes in the designated participating member node combination. For example, if the user list ciphertext data is suspected block list ciphertext data, then the common service data is a common block user list; if the user list ciphertext data is member user list ciphertext data, then the common service data is a common member user list. In addition, it is also possible to calculate the number of common service data of the designated participating member node combination based on the K data comparison sub-results.

In an embodiment of the present application, since the ciphertext service data is obtained by encrypting with a same encryption key array, if two pieces of ciphertext service data are the same, then corresponding two pieces of plaintext service data are also the same, so the central node could directly compare the ciphertext service data of different participating member nodes, that is, it can be determined which same plaintext service data (i.e., common service data) is included across different participating member nodes, thus, the central node does not need to decrypt the ciphertext service data, so there is no need to acquire a corresponding data decryption key, that is, the service data in the data comparison process exists in a form of ciphertext, thereby ensuring the security of data in the whole data processing process.

In addition, if the data comparison result includes data comparison sub-results respectively corresponding to K pieces of ciphertext service data of the first participating member node, that is, ciphertext service data and data comparison sub-results are in a one-to-one correspondence, each data comparison sub-result is used to represent a set of second participating member nodes holding a certain piece of ciphertext service data of the first participating member node, and the set of second participating member nodes includes a plurality of second participating member nodes with the same ciphertext service data. That is, the data comparison sub-results include corresponding relationships between the ciphertext service data and a plurality of second participating member nodes with the ciphertext service data, then the first participating member node could determine common service data of any designated participating member node combination based on the K data comparison sub-results. It can be seen that, in the embodiment of present application, the service data in the data comparison result acquired by the first participating member node from the central node also exists in the form of ciphertext, and the data comparison result only contains data comparison sub-results related to respective ciphertext service data of participating member nodes, and only the central node can acquire all ciphertext service data in the whole data processing process, since the central node cannot obtain a data decryption key, there is no need to add forged service data for the purpose of mixing-up, so the volume of ciphertext service data used in the data comparison process will not be increased, thereby improving the data processing efficiency of the whole process. And, since the data comparison sub-results generated by the central node include corresponding relationships between the ciphertext service data of the first participating member node and a plurality of second participating member nodes holding the ciphertext service data, it is not specific to which common service data is held by a certain preset participating member node combination, therefore, the first participating member node could determine common service data of any designated participating member node combination based on the data comparison sub-results respectively corresponding to K pieces of ciphertext service data (i.e., a data comparison result obtained by executing a data comparison task once), where the designated participating member node combination could include a node combination obtained from all combinations between the first participating member node and other participating member nodes, thus, the first participating member node can determine, according to actual requirements, which common service data is specifically contained for any participating member node combination expected to be known, to improve the flexibility of determining common service data and meet personalized requirements of different participating member nodes for determining common service data of any node combination.

Figure 2:
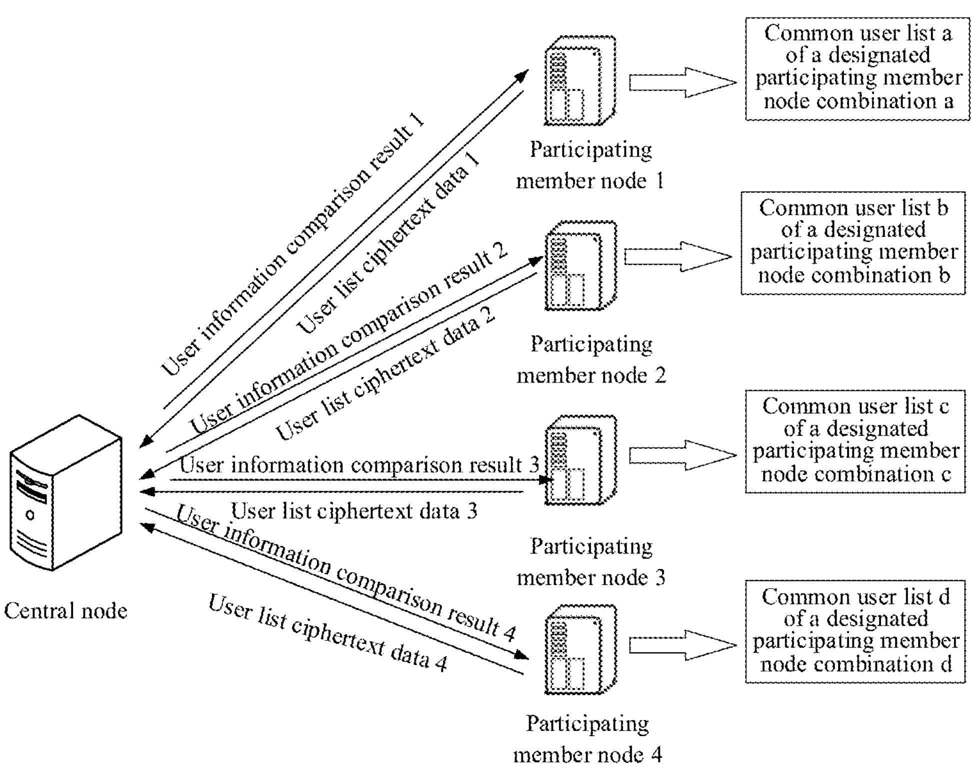
FIG. 2 is a principle diagram of a first specific implementation of a data processing method according to an embodiment of the present application.

In a specific embodiment, an example is taken where the ciphertext data set includes user list ciphertext data, the user list ciphertext data includes K pieces of ciphertext user information and the central node sends the data comparison result to the first participating member node; as shown in FIG. 2, a specific implementation process is given to a data processing method, which mainly includes the following steps.

(1) Participating member nodes encrypt respective K pieces of plaintext user information based on an encryption key array respectively, to obtain user list ciphertext data. Different participating member nodes use a same encryption key array. For example, the n participating member nodes include participating member node 1 to participating member node 4, participating member node 1 obtains user list ciphertext data 1 through encryption, participating member node 2 obtains user list ciphertext data 2 through encryption, participating member node 3 obtains user list ciphertext data 3 through encryption, and participating member node 4 obtains user list ciphertext data 4 through encryption.

(2) The participating member nodes send respectively generated user list ciphertext data to the central node.

(3) After receiving user list ciphertext data sent by n participating member nodes respectively, the central node obtains user information comparison results respectively corresponding to the participating member nodes by comparing user information based on n pieces of user list ciphertext data. Specifically, user information comparison result 1 corresponding to the participating member node 1 is obtained by comparing user information based on user list ciphertext data 1 to user list ciphertext data 4; user information comparison result 2 corresponding to the participating member node 2 is obtained by comparing user information based on user list ciphertext data 1 to user list ciphertext data 4; user information comparison result 3 corresponding to the participating member node 3 is obtained by comparing user information based on user list ciphertext data 1 to user list ciphertext data 4; user information comparison result 4 corresponding to the participating member node 4 is obtained by comparing user information based on user list ciphertext data 1 to user list ciphertext data 4.

(4) The central node sends the user information comparison results to the corresponding participating member nodes. Specifically, the user information comparison result 1 is sent to the participating member node 1, the user information comparison result 2 is sent to the participating member node 2, the user information comparison result 3 is sent to the participating member node 3, the user information comparison result 4 is sent to the participating member node 4, and user information comparison result 5 is sent to the participating member node 5.

(5) The participating member nodes determine a common user list of any designated participating member node combination based on the received user information comparison results. For example, the participating member node 1 determines a common user list a of a designated participating member node combination a, the participating member node 2 determines a common user list b of a designated participating member node combination b, the participating member node 3 determines a common user list c of a designated participating member node combination c, and the participating member node 4 determines a common user list d of a designated participating member node combination d. In addition, the number of common users of any designated participating member node combination can also be determined.

Figure 3:
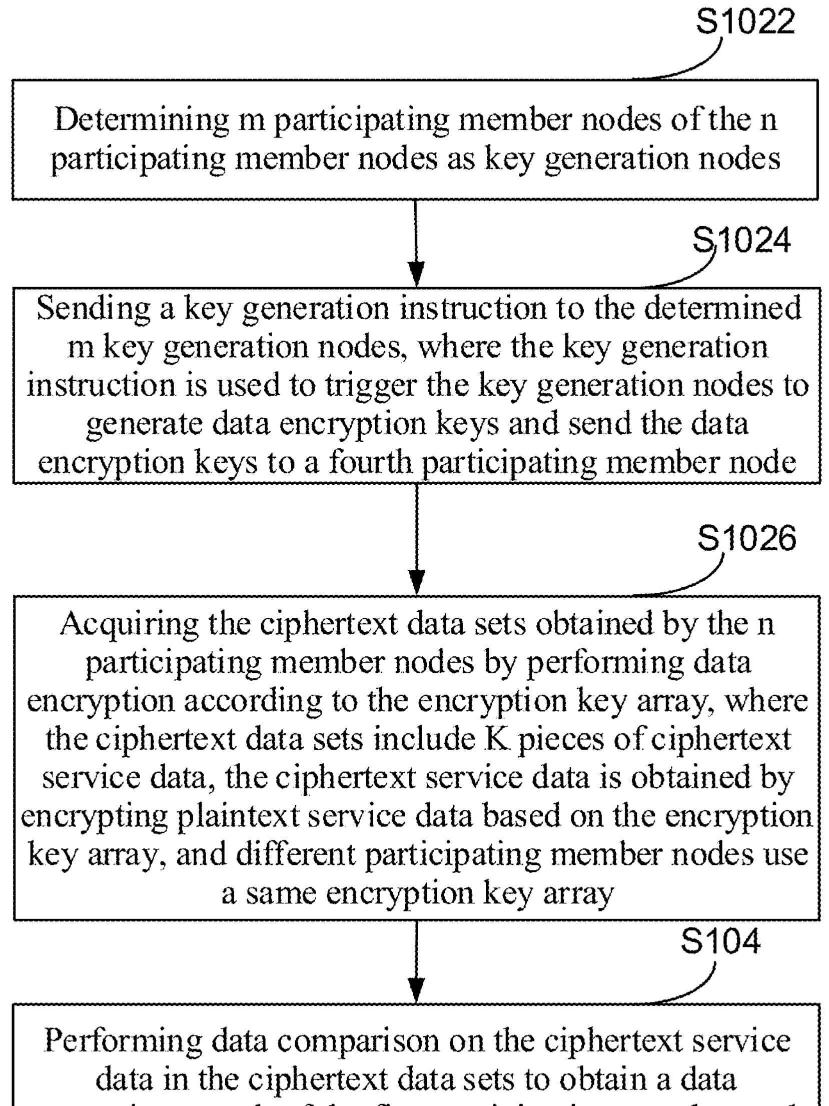
FIG. 3 is a second schematic flowchart of a data processing method applied to a central node according to an embodiment of the present application.

There are n participating member nodes, for an encrypting process of plaintext service data of the participating member nodes, since the central node can acquire ciphertext service data of all participating member nodes, in order to improve data security, the central node cannot know the data encryption key, so that the ciphertext service data cannot be decrypted. Based on this, m data encryption keys in the encryption key array are generated by m participating member nodes of the n participating member nodes, as shown in FIG. 3, S102 as described above for acquiring the ciphertext data sets sent by the participating member nodes specifically includes the following steps.

At S1022, m participating member nodes of the n participating member nodes are determined as key generation nodes.

Among them, m is an integer greater than 1 and less than or equal to n, the m key generation nodes include a first participating member node and/or a third participating member node, and the third participating member node does not include the first participating member node, that is, the third participating member node is any one of the n participating member nodes that is different from the first participating member node. Specifically, all of the n participating member nodes could be directly used as the key generation nodes, that is, m is equal to n, or the value of m can be preset in combination with human experience, and then m participating member nodes could be randomly selected from the n participating member nodes as the key generation nodes, that is, m is less than n. However, considering that the larger the value of m is, the more complicated an encryption process of service data is, therefore, in order to improve the accuracy of determining the value of M, give consideration to data security and data encryption efficiency at the same time, the value of m could be determined based on a data security level, that is, the value of m is related to the data security level of a current data processing task. Based on this, a determining process of key generation nodes specifically includes: based on a data security level of a data processing task, determining the number of participating member nodes participating in key generation; m participating member nodes are selected from the n participating member nodes as key generation nodes based on the number of participating member nodes.

At S1024, a key generation instruction is sent to the determined m key generation nodes, where the key generation instruction is used to trigger the key generation nodes to generate data encryption keys and send the data encryption keys to a fourth participating member node.

Specifically, the fourth participating member node does not include a key generation node that sends the data encryption key, that is, for each key generation node, a data encryption key generated by each node is sent to other participating member nodes, and the fourth participating member node is any one of the n participating member nodes that is different from the key generation node that sends the data encryption key. The fourth participating member node and the third participating member node may be the same or different.

Specifically, a set of data encryption keys respectively generated by m key generation nodes constitutes the encryption key array. For example, the value of m is equal to 3 and the n participating member nodes include participating member node 1 to participating member node 5, if three key generation nodes determined from participating member nodes 1 to 5 include participating member node 1, participating member node 2 and participating member node 3, then the central node sends a key generation instruction to participating member node 1, participating member node 2 and participating member node 3. After receiving the key generation instruction, the participating member node 1 generates a data encryption key A1 according to a key generation manner and sends the data encryption key A1 to the participating member nodes 2 to 5. After receiving the key generation instruction, the participating member node 2 generates a data encryption key A2 according to the key generation manner and sends the data encryption key A2 to the participating member nodes 1, 3 to 5. After receiving the key generation instruction, the participating member node 3 generates a data encryption key A3 according to the key generation manner and sends the data encryption key A3 to the participating member nodes 1 to 2 and 4 to 5. Thus, participating member nodes 1 to 5 all will get an encryption key array (A1, A2, A3).

Specifically, considering that respective data encryption keys in the encryption key array used by participating member nodes 1 to 5 in the data encryption process should be consistent in order, to ensure that the same ciphertext service data is obtained by encrypting the same plaintext service data, therefore, in the process of sending the key generation instruction by the central node to the determined m key generation nodes, one key generation node could be selected from the m key generation nodes in turn as a current sending object, the key generation instruction is sent to the current sending object, and a next current sending object is selected from the m key generation nodes after receiving key generation succeeded feedback information returned by the current sending object, until all the m key generation nodes are selected. After the key generation nodes send their respective generated data encryption keys to the fourth participating member node, and after the fourth participating member node returns a key reception succeeded notification, the key generation succeeded feedback information is sent to the central node. This can ensure that each participating member node acquires the m data encryption keys in a consistent receiving order, so the same encryption key array is constructed for each participating member node.

In addition, the n participating member nodes only send data encryption keys generated respectively, and service data will not be exchanged between the n participating member nodes, so it does not exist the problem that the service data is leaked cross the n participating member nodes, thereby further improving the data security.

At S1026, the ciphertext data sets obtained by the n participating member nodes are acquired by performing data encryption according to the encryption key array. The ciphertext data set includes K pieces of ciphertext service data. The ciphertext service data is obtained by encrypting plaintext service data based on the encryption key array, and different participating member nodes use a same encryption key array.

Specifically, for a process that the central node acquires the ciphertext data sets from the participating member nodes, it could be that the participating member nodes actively send to the central node after generating the ciphertext data sets, it also could be that the central node acquires from the participating member nodes. For example, the central node first sends a ciphertext data acquiring request to the participating member nodes, and the participating member nodes send their respective ciphertext data sets to the central node after receiving the ciphertext data acquiring request, which is not limited in the present application. Both situations are within the protection scope of the present application.

Specifically, for a process of service data encryption, the participating member nodes could take the encryption key array as a whole, and obtain ciphertext service data by directly using the encryption key array to encrypt the plaintext service data generated by the participating member nodes. For example, for plaintext service data a, if there is an encryption key array (A1, A2, A3), ciphertext service data a is obtained by encrypting the plaintext service data a with the encryption key array (A1, A2, A3) as an encryption key sequence. Or, a participating member node takes m data encryption keys in the encryption key array as single encryption units respectively, and obtain ciphertext service data by encrypting plaintext service data generated by the participating member node for a plurality of times based on the encryption key array. For example, for plaintext service data a, if there is an encryption key array (A1, A2, A3), the plaintext service data a is encrypted first with data encryption key A1 to obtain intermediate ciphertext service data 1, then the intermediate ciphertext service data 1 is encrypted with data encryption key A2 to obtain intermediate ciphertext service data 2, and then the intermediate ciphertext service data 2 is encrypted with data encryption key A3 to obtain final ciphertext service data a. Then, any participating member node performs data encryption on the respective K pieces of plaintext service data based on the encryption key array, after a ciphertext data set containing the K pieces of plaintext service data is obtained, and the ciphertext data set is sent to the central node.

In order to ensure that individual participating member nodes are triggered to perform data encryption after each participating member node obtains m data encryption keys and an encryption key array is formed, based on this, S1026 as described above for acquiring the ciphertext data sets obtained by the n participating member nodes by performing data encryption according to the encryption key array, specifically includes the following steps.

At Step 1, in a case that the generation of the m data encryption keys is finished, a data encryption instruction is sent to the n participating member nodes. The data encryption instruction is used to trigger the participating member nodes to encrypt, based on the encryption key array, the plaintext service data generated by the participating member nodes to obtain the ciphertext service data.

Specifically, after the key generation nodes successfully send the data encryption keys generated by themselves to a fourth participating member node (that is, the key generation nodes receive a key reception succeeded notification returned by the fourth participating member node), they will send key generation succeeded feedback information to the central node. Therefore, after receiving the key generation succeeded feedback information sent by the m key generation nodes respectively, the central node determines that the generation of the m data encryption keys is finished, and then the central node sends the data encryption instruction to the n participating member nodes.

At Step 2, a ciphertext data set containing K pieces of ciphertext service data sent by the participating member nodes respectively are acquired.

Figure 4:
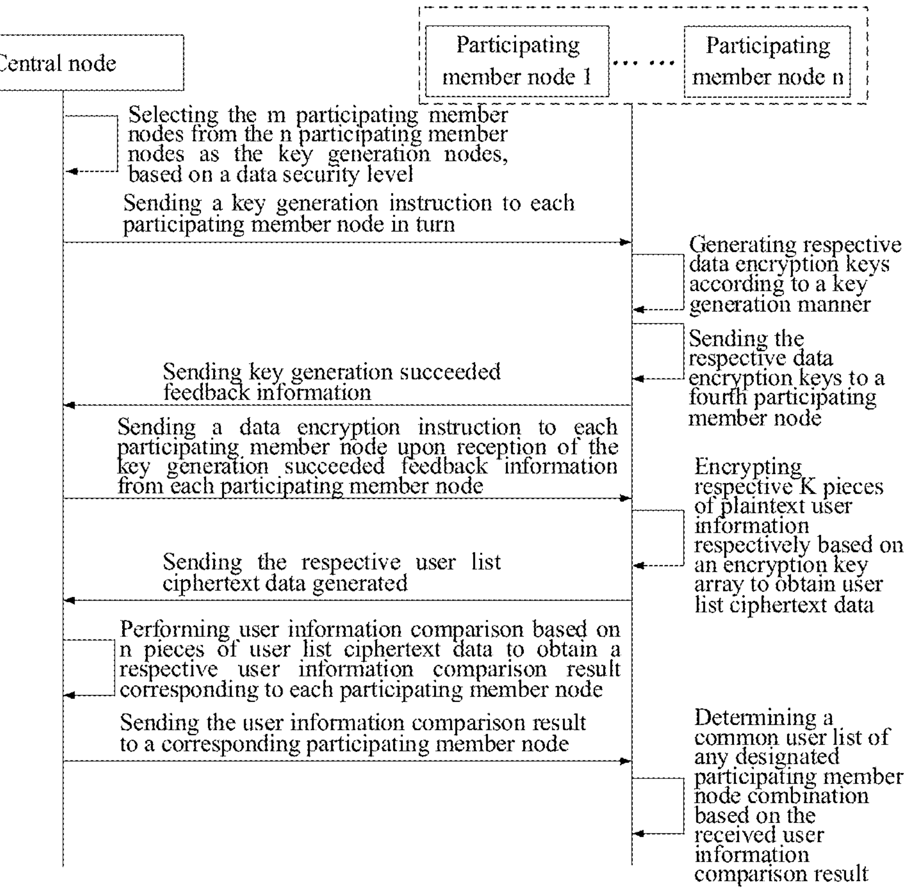
FIG. 4 is a principle diagram of a second specific implementation of a data processing method according to an embodiment of the present application.

In a specific embodiment, still, an example is taken where the ciphertext data set includes user list ciphertext data, the user list ciphertext data includes K pieces of ciphertext user information and the central node sends the data comparison result to the first participating member node; on the basis of FIG. 2 described above, as shown in FIG. 4, a specific implementation process is given to a data processing method, which mainly includes the following steps.

(1) The central node selects the m participating member nodes from the n participating member nodes as the key generation nodes, based on a data security level. For example, n is equal to M, that is, the above participating member node 1 to participating member node 4 are all used as the key generation nodes.

(2) The central node sends a key generation instruction to each participating member node in turn.

(3) After receiving the key generation instruction, the participating member nodes generate their respective data encryption keys according to a key generation manner, and send their respective data encryption keys to a fourth participating member node.

(4) After receiving a key reception succeeded notification returned by the fourth participating member node, the participating member nodes send key generation succeeded feedback information to the central node.

(5) The central node sends a data encryption instruction to each participating member node after receiving the key generation succeeded feedback information from each participating member node.

(6) After receiving the data encryption instruction, the participating member nodes encrypt respective K pieces of plaintext user information respectively based on an encryption key array to obtain user list ciphertext data. The encryption key array is constructed by the participating member nodes based on their respective data encryption keys and the received data encryption keys according to an acquiring order of the data encryption keys.

(7) The participating member nodes send their respective user list ciphertext data generated to the central node.

(8) The central node performs user information comparison based on n pieces of user list ciphertext data to obtain a respective user information comparison result corresponding to each participating member node.

(9) The central node sends the user information comparison result to the corresponding participating member node.

(10) The participating member node determines a common user list of any designated participating member node combination based on the received user information comparison result.

For a process of determining the data comparison result of the first participating member node, step 1 as described above for performing the data comparison on the ciphertext service data in the ciphertext data sets to determine the data comparison sub-result of the ciphertext service data of the first participating member node, specifically includes:

selecting ciphertext service data ready for comparison from the K pieces of ciphertext service data of the first participating member node;

determining a node identifier of a second participating member node according to data comparison on the currently selected ciphertext service data ready for comparison with the ciphertext service data in the n ciphertext data sets, where the second participating member node has the ciphertext service data ready for comparison;

generating, according to the node identifier of the second participating member node and the ciphertext service data ready for comparison, a data comparison sub-result corresponding to the ciphertext service data ready for comparison.

Figure 5:
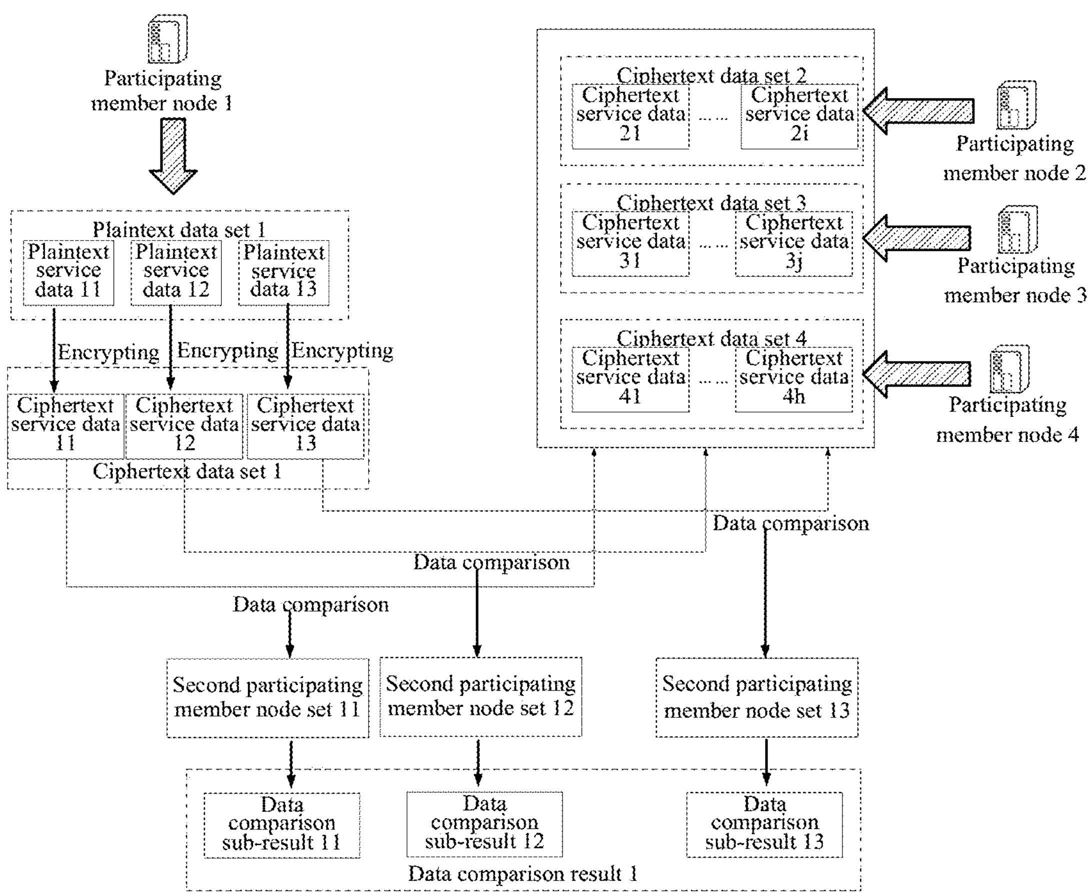
FIG. 5 is a principle diagram of a third specific implementation of a data processing method according to an embodiment of the present application.

In a specific embodiment, still, an example is taken where the n participating member nodes include participating member node 1 to participating member node 4, as shown in FIG. 5, a specific process in which the central node determines the data comparison result 1 of the participating member node 1 based on the n ciphertext data sets mainly includes the following steps.

For the first participating member node being participating member node 1, if the K pieces of plaintext service data (i.e., plaintext data set 1) of participating member node 1 include plaintext service data 11, plaintext service data 12 and plaintext service data 13, correspondingly, after the plaintext service data is encrypted based on the encryption key array, the K pieces of ciphertext service data (i.e., ciphertext data set 1) of participating member node 1 include ciphertext service data 11, ciphertext service data 12 and ciphertext service data 13. Similarly, participating member node 2 encrypts all plaintext service data in plaintext data set 2 to a generate ciphertext data set 2 (including ciphertext service data 21 to ciphertext service data 2*i*); participating member node 3 encrypts all plaintext service data in plaintext data set 3 to a generate ciphertext data set 3 (including ciphertext service data 31 to ciphertext service data 3*j*); participating member node 4 encrypts all plaintext service data in plaintext data set 4 to generate ciphertext data set 4 (including ciphertext service data 41 to ciphertext service data 4*h*), where each of i, j and h is an integer greater than 1.

In a process of determining the data comparison result 1 of the participating member node 1 based on the n ciphertext data sets, firstly, the ciphertext service data 11 is taken as head ciphertext service data ready for comparison, data comparison is performed between the ciphertext service data 11 and each ciphertext service data in the ciphertext data sets respectively corresponding to the participating member nodes 2 to 4, and according to a comparison result, the participating member node(s) holding the ciphertext service data 11 is (are) taken as the second participating member node(s) of the ciphertext service data 11 to obtain a set of second participating member nodes 11, and then a data comparison sub-result 11 is obtained. For example, the data comparison sub-result 11 corresponding to the ciphertext service data 11 could be represented as {ciphertext service data 11, a set of second participating member nodes 11}. If the participating member nodes 1 to 3 all contain the same ciphertext service data as the ciphertext service data 11, then the set of second participating member nodes 11 can be represented as [10001, 10002, 10003].

Then, the ciphertext service data 12 is taken as next ciphertext service data ready for comparison, and data comparison is performed between the ciphertext service data 12 and each ciphertext service data in the ciphertext data sets respectively corresponding to the participating member nodes 2 to 4. According to a comparison result, the participating member node(s) holding the ciphertext service data 12 is taken as the second participating member node(s) of the ciphertext service data 12 to obtain a set of second participating member nodes 12, and then a data comparison sub-result 12 is obtained. For example, the data comparison sub-result 12 corresponding to the ciphertext service data 12 could be represented as {ciphertext service data 12, a set of second participating member nodes 12}. If both the participating member nodes 1 and 4 contain the same ciphertext service data as the ciphertext service data 12, then the set of second participating member nodes 12 could be represented as [10001, 10004].

Next, the ciphertext service data 13 is taken as next ciphertext service data ready for comparison, and data comparison is performed between the ciphertext service data 13 and each ciphertext service data in the ciphertext data sets respectively corresponding to participating member nodes 2 to 4. According to a comparison result, the participating member node(s) holding the ciphertext service data 13 is (are) taken as the second participating member node(s) of the ciphertext service data 13 to obtain a set of second participating member nodes 13, and then the data comparison sub-result 13 is obtained. For example, the data comparison sub-result 13 corresponding to the ciphertext service data 13 could be represented as {ciphertext service data 13, a set of second participating member nodes 13}. If the participating member nodes 1, 3 and 4 all contain the same ciphertext service data as the ciphertext service data 13, then the set of second participating member nodes 13 could be represented as [10001, 10003, 10004].

So far, data comparison sub-results 11, 12 and 13 respectively corresponding to ciphertext service data 11, ciphertext service data 12 and ciphertext service data 13 of the participating member node 1 have been determined, thereby obtaining the data comparison result 1 of the participating member node 1. By analogy, a data comparison result 2 of the participating member node 2, a data comparison result 3 of the participating member node 3, and a data comparison result 4 of the participating member node 4 are determined in turn, and a specific process is not repeated here.

For one same piece of ciphertext service data, no matter which participating member node the ciphertext service data belongs to, the same set of second participating member nodes will be determined for the ciphertext service data. Based on this, if the ciphertext service data has been selected as the ciphertext service data ready for comparison in the process of determining data comparison results of other participating member nodes, then a set of second participating member nodes corresponding to the ciphertext service data is known. Therefore, in order to improve the efficiency of determining the data comparison result, the data comparison sub-result corresponding to the selected ciphertext service data ready for comparison could be added to a set of historical comparison sub-results, thus, for the currently selected ciphertext service data ready for comparison, it is firstly judged whether a first comparison sub-result corresponding to the currently selected ciphertext service data ready for comparison exists in a set of historical comparison sub-results, if yes, the first comparison sub-result could be directly determined as the data comparison sub-result of the currently selected ciphertext service data ready for comparison, and only if not, the currently selected ciphertext service data ready for comparison will be compared with the ciphertext service data in the ciphertext data sets respectively corresponding to other participating member nodes. Specifically, determining the node identifier of the second participating member node according to data comparison on the currently selected ciphertext service data ready for comparison with the ciphertext service data in the n ciphertext data sets specifically includes the following steps.

At step C1, it is determined whether a first comparison sub-result of the ciphertext service data ready for comparison exists in a set of historical comparison sub-results. The set of historical comparison sub-results includes the data comparison sub-results of the ciphertext service data that has been compared.

For example, in a process of determining data comparison result 1 for the participating member node 1, for any piece of ciphertext service data ready for comparison in ciphertext data set 1, data comparison is performed based on the ciphertext service data ready for comparison with n ciphertext data sets, to determine a data comparison sub-result of the ciphertext service data ready for comparison, and the data comparison sub-result of the ciphertext service data ready for comparison is added to a set of historical comparison sub-results. Specifically, a data comparison sub-result 11 corresponding to the ciphertext service data 11, a data comparison sub-result 12 corresponding to the ciphertext service data 12 and a data comparison sub-result 13 corresponding to the ciphertext service data 13 are determined, and the data comparison sub-result 11, the data comparison sub-result 12 and the data comparison sub-result 13 are added to a set of historical comparison sub-results. Based on this, after determining the data comparison result 1 for the participating member node 1, the set of historical comparison sub-results includes the data comparison sub-result 11 corresponding to the ciphertext service data 11, the data comparison sub-result 12 corresponding to the ciphertext service data 12 and the data comparison sub-result 13 corresponding to the ciphertext service data 13. Therefore, in the process of determining the data comparison result 2 for the participating member node 2, for any piece of ciphertext service data in the ciphertext data set 2, it is first determined whether a data comparison sub-result of the ciphertext service data exists in the set of historical comparison sub-results.

At Step C2, if the first comparison sub-result of the ciphertext service data ready for comparison exists in the set of historical comparison sub-results, a node identifier of a second participating member node having the ciphertext service data ready for comparison is determined based on the first comparison sub-result.

Specifically, if the first comparison sub-result corresponding to the ciphertext service data ready for comparison exists in the historical comparison sub-result set, it means that the ciphertext service data has been selected as the ciphertext service data ready for comparison in the process of determining the data comparison sub-results of other participating member nodes, so a set of second participating member nodes corresponding to the ciphertext service data is known. Therefore, The first comparison sub-result in the historical comparison sub-result set could be directly determined as the data comparison sub-result of the ciphertext service data ready for comparison, without execution of a step of performing data comparison on the ciphertext service data ready for comparison with the n ciphertext data sets.

Step C3, if the first comparison sub-result of the ciphertext service data ready for comparison does not exist in the set of historical comparison sub-results, a second participating member node having the ciphertext service data ready for comparison is determined based on data comparison on the ciphertext service data ready for comparison with the ciphertext service data in the n ciphertext data sets. Specifically, one-to-one comparison is performed between the ciphertext service data ready for comparison and some ciphertext service data in the ciphertext data sets respectively sent by the n participating member nodes.

In addition, in the process of determining the data comparison result 1 for the participating member node 1, not only the data comparison sub-result of the ciphertext service data ready for comparison is added to the historical comparison sub-result set, but also the data comparison sub-result of the ciphertext service data ready for comparison is stored in a reserved comparison sub-result set, thus, after determining the data comparison sub-result 11, the data comparison sub-result 12 and the data comparison sub-result 13, the reserved comparison sub-result set includes the data comparison sub-result 11, the data comparison sub-result 12 and the data comparison sub-result 13, that is, each data comparison sub-result in the reserved comparison sub-result set is fetched, and a combination of individual fetched data comparison sub-results is determined as a data comparison result 1. Next, a data comparison sub-result determined for the participating member node 2 could be stored in the reserved comparison sub-result set, thereby obtaining a data comparison result 2.

It should be noted that in a process of data comparison, there is no need to compare the ciphertext service data ready for comparison with the ciphertext data set of the currently targeted first participating member node, but only with ciphertext data sets of other participating member nodes except the currently targeted first participating member node. For the first participating member node whose data comparison result has been determined, data comparison has been performed between the ciphertext service data ready for comparison and the ciphertext data set of the first participating member node, therefore, in order to further improve the efficiency of data comparison, it is only necessary to compare the ciphertext service data ready for comparison with the ciphertext data sets of other participating member nodes except the currently targeted first participating member node and the first participating member node whose data comparison result has been determined.

In the data processing method of the embodiment of the present application, in one aspect, since ciphertext service data is obtained by encrypting with a same encryption key array, and if two pieces of ciphertext service data are the same, corresponding two pieces of plaintext service data are also the same, so a central node can directly compare ciphertext service data of different participating member nodes to obtain a data comparison result of a first participating member node, and based on the data comparison result, then a determination can be made on which same plaintext service data (i.e., common service data) is included between the participating member nodes, in this way, since the data comparison process is uniformly executed by the central node, service data will not be intercommunicated between the participating member nodes, and the central node directly performs data comparison based on the ciphertext service data without decrypting the ciphertext service data, so there is no need to acquire a corresponding data decryption key, that is, the service data in the data comparison process exists in a form of ciphertext, thereby ensuring the security of service data in the whole data processing process. In another aspect, a data comparison result obtained by each participating member node from the central node could only contain data comparison sub-results related to respective ciphertext service data of the participating member node, for a case that the data comparison sub-results contain service data, the service data is also generated by the participating member node itself and exists in a form of ciphertext, in the whole data processing process, only the central node can acquire all ciphertext service data, since the central node cannot obtain a data decryption key, there is no need to add forged service data for the purpose of mixing up, so the volume of ciphertext service data used in the data comparison process will not be increased, thereby improving the data processing efficiency of the whole process. In yet another aspect, since the data comparison result generated by the central node could include data comparison sub-results, and each data comparison result could include a correspondence relationship between any piece of ciphertext service data of the first participating member node and a plurality of second participating member nodes holding the ciphertext service data, rather than being specific to which common service data is held by a certain preset participating member node combination, therefore, the first participating member node could determine common service data of any designated participating member node combination based on the data comparison sub-results of the ciphertext service data (i.e., a data comparison result obtained by executing a data comparison task once), where the designated participating member node combination could include a node combination obtained from all combinations between the first participating member node and other participating member nodes, thus, the first participating member node could, according to actual requirements, determine which common service data is specifically contained for any participating member node combination expected to be known, to improve the flexibility of determining common service data and meet personalized requirements of different participating member nodes for determining common service data of any node combination.

Figure 6:
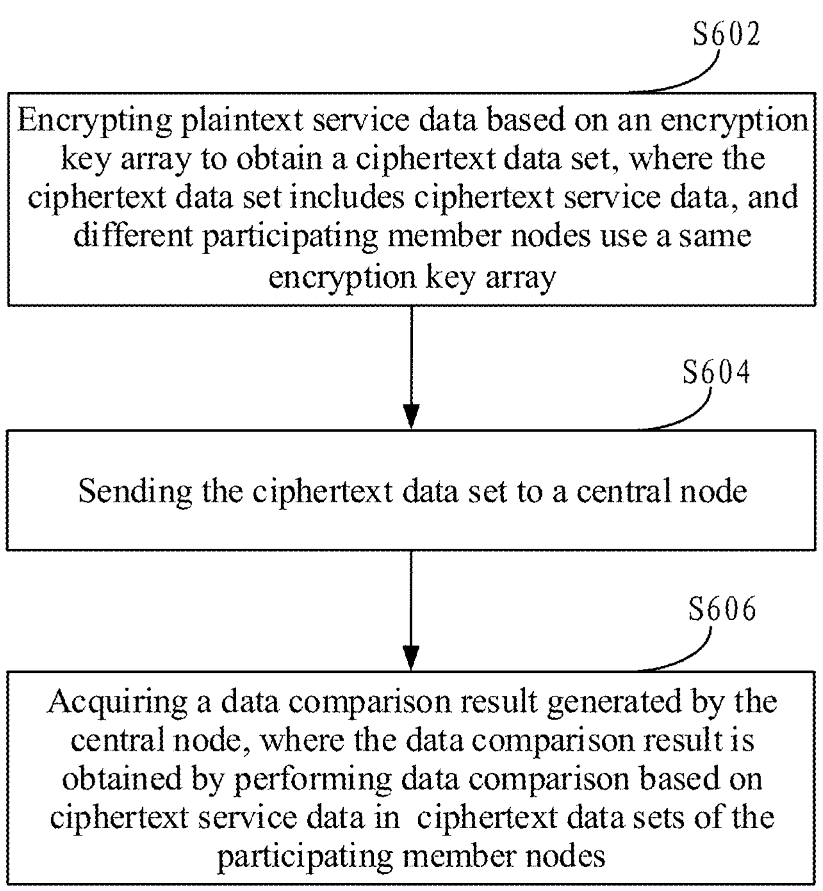
FIG. 6 is a schematic flowchart of a data processing method applied to participating member nodes according to an embodiment of the present application.

Based on the same technical concept, an embodiment of the present application also provides a data processing method corresponding to the data processing method described in FIG. 1 to FIG. 5. FIG. 6 is a schematic flowchart of a data processing method according to an embodiment of the present application, and the method in FIG. 6 can be executed by the first participating member node. As shown in FIG. 6, the method at least includes the following steps.

At S602, plaintext service data is encrypted based on an encryption key array to obtain a ciphertext data set. The ciphertext data set includes ciphertext service data, and different participating member nodes use a same encryption key array.

At S604, the ciphertext data set is sent to a central node. Specifically, the central node obtains a data comparison result of the first participating member node by performing data comparison based on ciphertext data sets sent by participating member nodes.

In some exemplary embodiments, the above data comparison result could include common service data of a preset participating member node combination, that is, the central node directly determines which common service data is held by the preset participating member node combination, and the first participating member node acquires, from the central node, the common service data determined by the central node, in this way, since a plurality of participants in the preset participating member node combination are fixed, there would definitely be a problem that common service data is determined with poor flexibility, which cannot meet personalized requirements of different participating member nodes to determine common service data of any participating member node combination. In other exemplary embodiments, the above data comparison result could include K data comparison sub-results, each of which represents a set of second participating member nodes holding the ciphertext service data of the first participating member node, that is, the data comparison result acquired by the first participating member node from the central node is not specific to which common service data is held by a certain preset participating member node combination. Therefore, the first participating member node could determine the common service data of any designated participating member node combination based on the data comparison sub-results corresponding to K pieces of ciphertext service data respectively (i.e., the data comparison result obtained by executing a data comparison task once), thus, the first participating member node could determine, according to actual requirements, which common service data is specifically contained for any participating member node combination expected to be known, to improve the flexibility of determining common service data and meet personalized requirements of different participating member nodes for determining common service data of any node combination At S606, a data comparison result generated by the central node is acquired. The data comparison result is obtained by performing data comparison based on ciphertext service data in ciphertext data sets of the participating member nodes.

Specifically, the data comparison result could be obtained by the central node by performing data comparison based on the ciphertext service data in the ciphertext data sets respectively sent by n participating member nodes. After acquiring the data comparison result, the first participating member node determines common service data of a participating member node combination based on the data comparison result. For a case that the data comparison result includes common service data of a preset participating member node combination, the first participating member node could obtain the common service data of the preset participating member node combination directly based on the data comparison result. But for a case that the data comparison result includes K data comparison sub-results obtained by performing data comparison based on ciphertext data sets sent by n participating member nodes, and each data comparison sub-result represents a set of second participating member nodes holding the ciphertext service data of the first participating member node, the first participating member node determines common service data of any designated participating member node combination based on the received K data comparison sub-results, and the designated participating member node combination includes the first participating member node and at least one fifth participating member node.

Specifically, after acquiring the data comparison result, the first participating member node determines a target comparison sub-result including a node identifier of each participating member node in the designated participating member node combination based on K data comparison sub-results in the data comparison result, and determines the service data targeted by the target comparison sub-result as common service data of the designated participating member node combination.

In an embodiment of the present application, since the ciphertext service data is obtained by encrypting with a same encryption key array, if two pieces of ciphertext service data are the same, then the corresponding two pieces of plaintext service data are also the same, so the central node could directly compare the ciphertext service data of different participating member nodes, then a determination can be made on which same plaintext service data (i.e., common service data) is included between different participating member nodes, in this way, the central node does not need to decrypt the ciphertext service data, so there is no need to acquire a corresponding data decryption key, that is, the service data in the data comparison process exists in a form of ciphertext, thereby ensuring the security of service data in the whole data processing process.

In addition, if the data comparison result includes data comparison sub-results respectively corresponding to the K pieces of ciphertext service data of the first participating member node, that is, ciphertext service data and data comparison sub-results are in one-to-one correspondence, each data comparison sub-result is used to represent a set of second participating member nodes holding a certain piece of ciphertext service data of the first participating member node, and the set of second participating member nodes includes a plurality of second participating member nodes holding the same ciphertext service data. That is, the data comparison sub-results include corresponding relationships between the ciphertext service data and a plurality of second participating member nodes holding the ciphertext service data, then the first participating member node can determine the common service data of any designated participating member node combination based on the K data comparison sub-results. It can be seen that, in the embodiment of present application, the service data in the data comparison result obtained by the first participating member node from the central node also exists in the form of ciphertext, and the data comparison result only contains data comparison sub-results related to the respective ciphertext service data of participating member nodes, and only the central node can acquire all ciphertext service data in the whole data processing process, since the central node cannot obtain a data decryption key, there is no need to add forged service data for the purpose of mixing-up, so the volume of ciphertext service data used in the data comparison process will not be increased, thereby improving the data processing efficiency of the whole process. And, since the data comparison sub-results generated by the central node include corresponding relationships between the ciphertext service data of the first participating member node and a plurality of second participating member nodes holding the ciphertext service data, it is not specific to which common service data is held by a certain preset participating member node combination, therefore, the first participating member node can determine the common service data of any designated participating member node combination based on the data comparison sub-results respectively corresponding to K pieces of ciphertext service data (i.e., a data comparison result obtained by executing a data comparison task once), where the designated participating member node combination can include a node combination obtained from all combinations between the first participating member node and other participating member nodes, thus, the first participating member node could, according to actual requirements, determine which common service data is specifically contained for any participating member node combination expected to be known to improve the flexibility of determining common service data and meet personalized requirements of different participating member nodes for determining common service data of any node combination.

S602 as described above for encrypting the plaintext service data based on the encryption key array to obtain the ciphertext data set, specifically includes:

determining an encryption key array containing m data encryption keys, where key generation nodes for the m data encryption keys include the first participating member node and a third participating member node, and where m is an integer greater than 1 and less than or equal to n, n represents a number of participating member nodes, and n is an integer greater than 1;

determining a ciphertext data set of the first participating node based on the encryption key array.

In an implementation, determining the ciphertext data set of the first participating node based on the encryption key array includes:

receiving a key generation instruction sent by the central node, where the key generation instruction is used to trigger a key generation node to generate a data encryption key and send the generated data encryption key to a fourth participating member node;

generating a data encryption key of the first participating node in response to the key generation instruction and receiving a data encryption key of the third participating node, to obtain the encryption key array.

In an implementation, determining the ciphertext data set of the first participating node based on the encryption key array includes:

receiving a data encryption instruction sent by the central node, where the data encryption instruction is used to trigger a participating member node to encrypt plaintext service data of a participating member node based on the encryption key array to obtain ciphertext service data of the participating member node;

in response to the data encryption instruction, determining the ciphertext data set of the first participating node based on the encryption key array.

In an implementation, encrypting the plaintext service data based on the encryption key array to obtain the ciphertext data set includes:

determining an encryption key array containing m data encryption keys, where key generation nodes of the m data encryption keys comprise a plurality of participating nodes different from the first participating member node, m is an integer greater than 1 and less than or equal to n, n represents a number of participating member nodes, and n is an integer greater than 1;

determining a ciphertext data set of the first participating node based on the encryption key array.

In an implementation, determining the encryption key array containing m data encryption keys includes:

receiving data encryption keys of the plurality of participating nodes different from the first participating member node as the encryption key array.

In an implementation, determining the ciphertext data set of the first participating node based on the encryption key array includes:

receiving a data encryption instruction sent by the central node, where the data encryption instruction is used to trigger a participating member node to encrypt plaintext service data of the participating member node based on the encryption key array to obtain ciphertext service data of the participating member node;

in response to the data encryption instruction, determining the ciphertext data set of the first participating node based on the encryption key array.

For a case that the ciphertext data set includes user list ciphertext data and the user list ciphertext data includes K pieces of ciphertext user information, the data comparison result is a user information comparison result, the user information comparison result includes K user information comparison sub-results, and the user information comparison sub-results are used to represent a set of second participating members holding ciphertext user information of the first participating member node.

In the data processing method of the embodiment of the present application, in one aspect, since ciphertext service data is obtained by encrypting with a same encryption key array, and if two pieces of ciphertext service data are the same, corresponding two pieces of plaintext service data are also the same, so a central node can directly compare ciphertext service data of different participating member nodes to obtain a data comparison result of a first participating member node, and based on the data comparison result, then a determination can be made on which same plaintext service data (i.e., common service data) is included between the participating member nodes, in this way, since the data comparison process is uniformly executed by the central node, service data will not be intercommunicated between the participating member nodes, and the central node directly performs data comparison based on the ciphertext service data without decrypting the ciphertext service data, so there is no need to acquire a corresponding data decryption key, that is, the service data in the data comparison process exists in a form of ciphertext, thereby ensuring the security of service data in the whole data processing process. In another aspect, a data comparison result obtained by each participating member node from the central node could only contain data comparison sub-results related to respective ciphertext service data of the participating member node, for a case that the data comparison sub-results contain service data, the service data is also generated by the participating member node itself and exists in a form of ciphertext, in the whole data processing process, only the central node can acquire all ciphertext service data, since the central node cannot obtain a data decryption key, there is no need to add forged service data for the purpose of mixing-up, so the volume of ciphertext service data used in the data comparison process will not be increased, thereby improving the data processing efficiency of the whole process. In yet another aspect, since the data comparison result generated by the central node could include data comparison sub-results, and each data comparison result could include a correspondence relationship between any piece of ciphertext service data of the first participating member node and a plurality of second participating member nodes holding the ciphertext service data, rather than being specific to which common service data is held by a certain preset participating member node combination, therefore, the first participating member node could determine common service data of any designated participating member node combination based on the data comparison sub-results of the ciphertext service data (i.e., a data comparison result obtained by executing a data comparison task once), where the designated participating member node combination could include a node combination obtained from all combinations between the first participating member node and other participating member nodes, thus, the first participating member node could, according to actual requirements, determine which common service data is specifically contained for any participating member node combination expected to be known, to improve the flexibility of determining common service data and meet personalized requirements of different participating member nodes for determining common service data of any node combination.

It should be noted that the present embodiment of the present application is based on a same inventive concept as the previous embodiment of the present application, thus reference can be made to the implementation of the above-mentioned data processing method for a specific implementation of the present embodiment, and repetition parts will not be repeated here.

Figure 7:
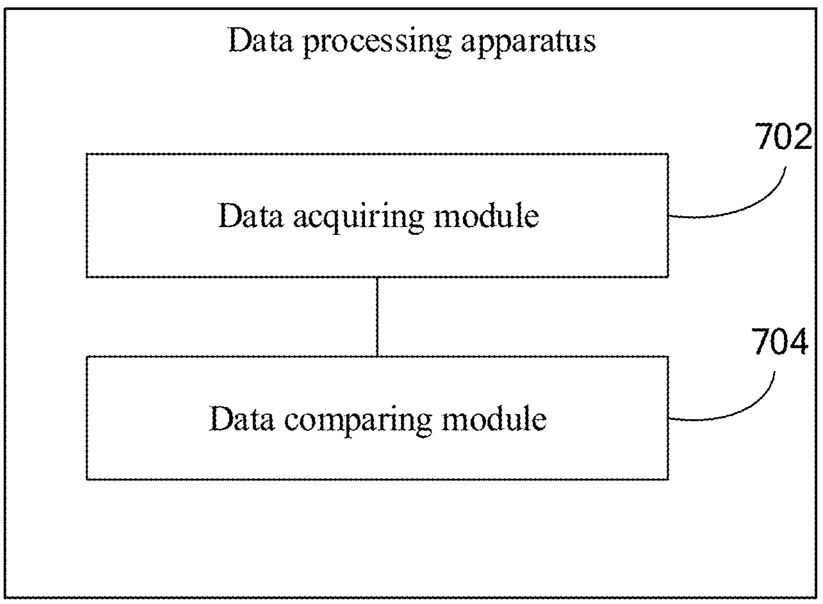
FIG. 7 is a schematic diagram of module composition of a data processing apparatus arranged at a central node according to an embodiment of the present application.

Based on the same technical concept, an embodiment of the present application also provides a data processing apparatus corresponding to the data processing method described in FIG. 1 to FIG. 5. FIG. 7 is a schematic diagram of module composition of a data processing apparatus arranged at a central node according to an embodiment of the present application. The apparatus is configured to perform the data processing method as described in FIG. 1 to FIG. 5. As shown in FIG. 7, the apparatus includes:

a data acquiring module 702, configured to acquire ciphertext data sets sent by participating member nodes, where a ciphertext data set includes ciphertext service data, where the ciphertext service data is obtained by encrypting plaintext service data based on an encryption key array, and different participating member nodes use a same encryption key array, and where the participating member nodes include a first participating member node; and a data comparing module 704, configured to perform data comparison on the ciphertext service data in the ciphertext data sets to obtain a data comparison result of the first participating member node.

In the data processing apparatus of the embodiment of the present application, in one aspect, since ciphertext service data is obtained by encrypting with a same encryption key array, and if two pieces of ciphertext service data are the same, corresponding two pieces of plaintext service data are also the same, so a central node can directly compare ciphertext service data of different participating member nodes to obtain a data comparison result of a first participating member node, and based on the data comparison result, then a determination can be made on which same plaintext service data (i.e., common service data) is included between the participating member nodes, in this way, since the data comparison process is uniformly executed by the central node, service data will not be intercommunicated between the participating member nodes, and the central node directly performs data comparison based on the ciphertext service data without decrypting the ciphertext service data, so there is no need to acquire a corresponding data decryption key, that is, the service data in the data comparison process exists in a form of ciphertext, to ensure the security of service data in the whole data processing process. In another aspect, a data comparison result acquired by each participating member node from the central node could only contain data comparison sub-results related to respective ciphertext service data of the participating member node, for a case that the data comparison sub-results contain service data, the service data is also generated by the participating member node itself and exists in a form of ciphertext, in the whole data processing process, only the central node can acquire all ciphertext service data, since the central node cannot obtain a data decryption key, there is no need to add forged service data for the purpose of mixing up, so the volume of ciphertext service data used in the data comparison process will not be increased, thereby improving the data processing efficiency of the whole process. In yet another aspect, since the data comparison result generated by the central node could include data comparison sub-results, and each data comparison result could include a correspondence relationship between any piece of ciphertext service data of the first participating member node and a plurality of second participating member nodes holding the ciphertext service data, rather than being specific to which common service data is held by a certain preset participating member node combination, therefore, the first participating member node could determine common service data of any designated participating member node combination based on the data comparison sub-results of the ciphertext service data (i.e., a data comparison result obtained by executing a data comparison task once), where the designated participating member node combination could include a node combination obtained from all combinations between the first participating member node and other participating member nodes, thus, the first participating member node could, according to actual requirements, determine which common service data is specifically contained for any participating member node combination expected to be known, to improve the flexibility of determining common service data and meet personalized requirements of different participating member nodes for determining common service data of any node combination.

It should be noted that the embodiment of the data processing apparatus of the present application is based on a same inventive concept as the embodiment of the data processing method of the present application, so reference can be made to the implementation of the above-mentioned data processing method for a specific implementation of the present embodiment, and repetition parts will not be repeated here.

Figure 8:
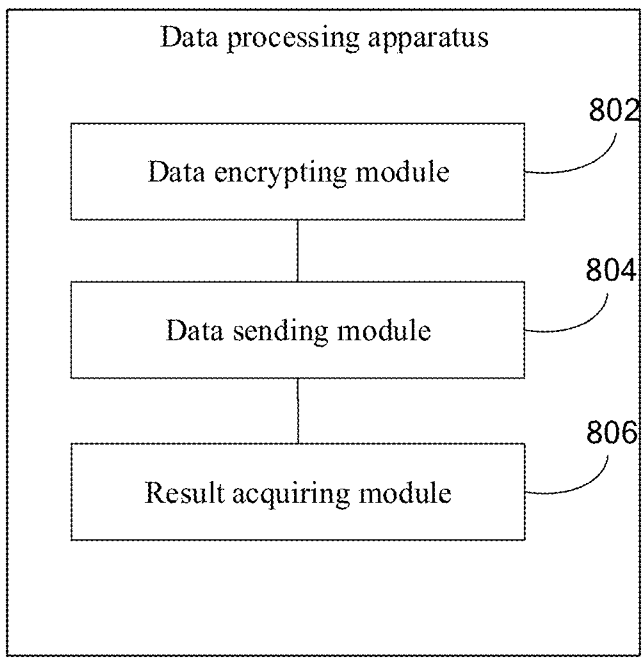
FIG. 8 is a schematic diagram of module composition of a data processing apparatus arranged at participating member nodes according to an embodiment of the present application.

Based on the same technical concept, an embodiment of the present application also provides a data processing apparatus corresponding to the data processing method described in FIG. 6. FIG. 8 is a schematic diagram of module composition of a data processing apparatus arranged at a first participating member node according to an embodiment of the present application. The apparatus is configured to execute the data processing method described in FIG. 6. As shown in FIG. 8, the apparatus includes:

- a data encrypting module 802, configured to encrypt plaintext service data based on an encryption key array to obtain a ciphertext data set, where the ciphertext data set includes ciphertext service data, and different participating member nodes use a same encryption key array;
- a data sending module 804, configured to send the ciphertext data set to a central node; and
- a result acquiring module 806, configured to acquire a data comparison result generated by the central node, where the data comparison result is obtained by performing data comparison based on ciphertext service data in ciphertext data sets of the participating member nodes.

In the data processing apparatus of the embodiment of the present application, in one aspect, since ciphertext service data is obtained by encrypting with a same encryption key array, and if two pieces of ciphertext service data are the same, corresponding two pieces of plaintext service data are also the same, so a central node can directly compare ciphertext service data of different participating member nodes to obtain a data comparison result of a first participating member node, and based on the data comparison result, a determination can be made on which same plaintext service data (i.e., common service data) is included between the participating member nodes, in this way, since the data comparison process is uniformly executed by the central node, service data will not be intercommunicated between the participating member nodes, and the central node directly performs data comparison based on the ciphertext service data without decrypting the ciphertext service data, so there is no need to acquire a corresponding data decryption key, that is, the service data in the data comparison process exists in a form of ciphertext, to ensure the security of service data in the whole data processing process. In another aspect, a data comparison result obtained by each participating member node from the central node could only contain data comparison sub-results related to respective ciphertext service data of the participating member node, for a case that the data comparison sub-results contain service data, the service data is also generated by the participating member node itself and exists in a form of ciphertext, in the whole data processing process, only the central node can acquire all ciphertext service data, since the central node cannot obtain a data decryption key, there is no need to add forged service data for the purpose of mixing-up, so the volume of ciphertext service data used in the data comparison process will not be increased, thereby improving the data processing efficiency of the whole process. In yet another aspect, since the data comparison result generated by the central node could include data comparison sub-results, and each data comparison result could include a correspondence relationship between any piece of ciphertext service data of the first participating member node and a plurality of second participating member nodes holding the ciphertext service data, rather than being specific to which common service data is held by a certain preset participating member node combination, therefore, the first participating member node could determine common service data of any designated participating member node combination based on the data comparison sub-results of the ciphertext service data (i.e., a data comparison result obtained by executing a data comparison task once), where the designated participating member node combination could include a node combination obtained from all combinations between the first participating member node and other participating member nodes, thus, the first participating member node could, according to actual requirements, determine which common service data is specifically contained for any participating member node combination expected to be known, to improve the flexibility of determining common service data and meet personalized requirements of different participating member nodes for determining common service data of any node combination.

It should be noted that the embodiment of the data processing apparatus of the present application is based on a same inventive concept as the embodiment of the data processing method of the present application, so reference can be made to the implementation of the above-mentioned data processing method for a specific implementation of the present embodiment, and repetition parts will not be repeated here.

Figure 9:
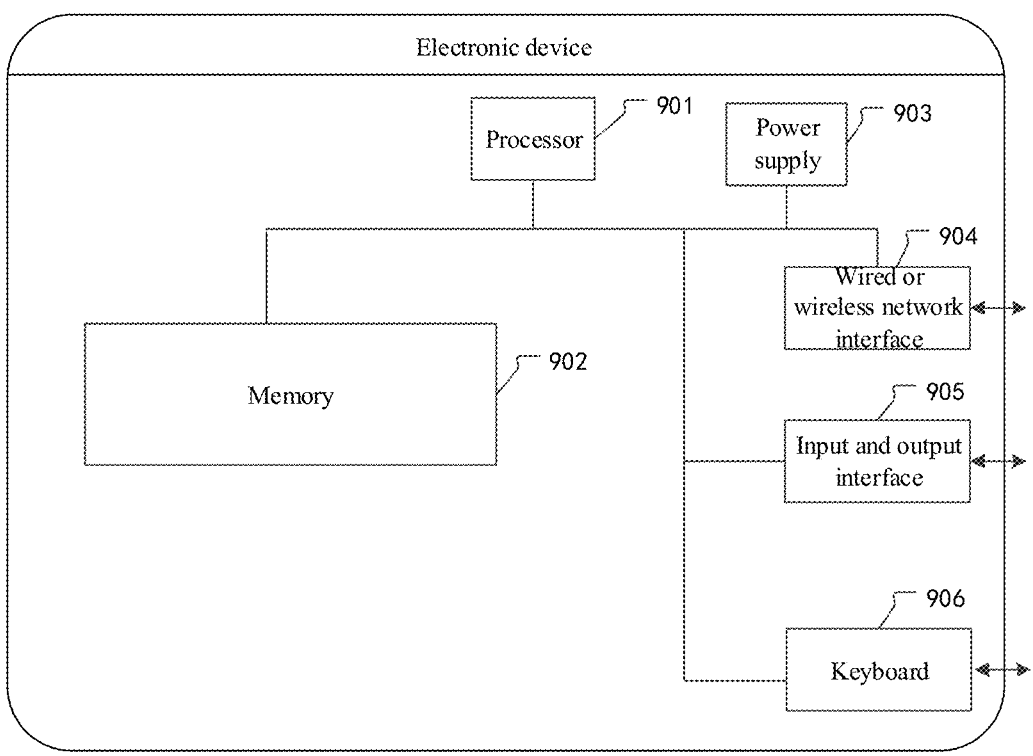
FIG. 9 is a schematic diagram of a structure of an electronic device according to an embodiment of the present application.

Further, based on the same technical concept, an embodiment of the present application also provides an electronic device corresponding to the data processing method described in FIG. 1 to FIG. 6, the device is configured to execute the above data processing method, as shown in FIG. 9.

The electronic device may vary greatly due to different configurations or performances, and could include one or more processors 901 and a memory 902. The memory 902 could store one or more storage applications or one piece or more pieces of data. The memory 902 could be a transitory storage or a permanent storage. An application stored in the memory 902 could include one or more modules (not shown in the figures), and each module could include a series of computer-executable instructions for the electronic device. Further, the processor 901 could be set to communicate with the memory 902 and to execute a series of computer-executable instructions in the memory 902 on the electronic device. The electronic device could also include one or more power supplies 903, one or more wired or wireless network interfaces 904, one or more input and output interfaces 905, one or more keyboards 906, etc.

In a specific embodiment, the electronic device includes a memory and one or more programs, where the one or more programs are stored in the memory, and the one or more programs could include one or more modules, and each module could include a series of computer-executable instructions for the electronic device, and the one or more processors are configured to perform the one or more programs containing the computer-executable instructions for:

acquiring ciphertext data sets sent by participating member nodes, where a ciphertext data set includes ciphertext service data, where the ciphertext service data is obtained by encrypting plaintext service data based on an encryption key array, and different participating member nodes use a same encryption key array, and where the participating member nodes include a first participating member node; and performing data comparison on the ciphertext service data in the ciphertext data sets to obtain a data comparison result of the first participating member node.

In another specific embodiment, the electronic device includes a memory and one or more programs, where the one or more programs are stored in the memory, and the one or more programs could include one or more modules, and each module could include a series of computer-executable instructions for the electronic device, and the one or more processors are configured to perform the one or more programs containing the computer-executable instructions for:

encrypting plaintext service data based on an encryption key array to obtain a ciphertext data set, where the ciphertext data set includes ciphertext service data, and different participating member nodes use a same encryption key array;

sending the ciphertext data set to a central node; and acquiring a data comparison result generated by the central node, where the data comparison result is obtained by performing data comparison based on ciphertext service data in ciphertext data sets of the participating member nodes.

In the electronic device of the embodiment of the present application, in one aspect, since ciphertext service data is obtained by encrypting with a same encryption key array, and if two pieces of ciphertext service data are the same, corresponding two pieces of plaintext service data are also the same, so a central node can directly compare ciphertext service data of different participating member nodes to obtain a data comparison result of a first participating member node, and based on the data comparison result, a determination can be made on which same plaintext service data (i.e., common service data) is included between the participating member nodes, in this way, since the data comparison process is uniformly executed by the central node, service data will not be intercommunicated between the participating member nodes, and the central node directly performs data comparison based on the ciphertext service data without decrypting the ciphertext service data, so there is no need to acquire a corresponding data decryption key, that is, the service data in the data comparison process exists in a form of ciphertext, to ensure the security of service data in the whole data processing process. In another aspect, a data comparison result obtained by each participating member node from the central node could only contain data comparison sub-results related to respective ciphertext service data of the participating member node, for a case that the data comparison sub-results contain service data, the service data is also generated by the participating member node itself and exists in a form of ciphertext, in the whole data processing process, only the central node can acquire all ciphertext service data, since the central node cannot obtain a data decryption key, there is no need to add forged service data for the purpose of mixing-up, so the volume of ciphertext service data used in the data comparison process will not be increased, thereby improving the data processing efficiency of the whole process. In yet another aspect, since the data comparison result generated by the central node could include data comparison sub-results, and each data comparison result could include a correspondence relationship between any piece of ciphertext service data of the first participating member node and a plurality of second participating member nodes holding the ciphertext service data, rather than being specific to which common service data is held by a certain preset participating member node combination, therefore, the first participating member node could determine common service data of any designated participating member node combination based on the data comparison sub-results of the ciphertext service data (i.e., a data comparison result obtained by executing a data comparison task once), where the designated participating member node combination could include a node combination obtained from all combinations between the first participating member node and other participating member nodes, thus, the first participating member node could, according to actual requirements, determine which common service data is specifically contained for any participating member node combination expected to be known, to improve the flexibility of determining common service data and meet personalized requirements of different participating member nodes for determining common service data of any node combination.

It should be noted that the embodiment of the electronic device of the present application is based on a same inventive concept as the embodiment of the data processing method of the present application, so reference can be made to the implementation of the above-mentioned data processing method for a specific implementation of the present embodiment, and repetition parts will not be repeated here.

Further, based on the same technical concept, an embodiment of the present application also provides a computer readable storage medium corresponding to the data processing method described in FIG. 1 to FIG. 6, which is configured to store computer executable instructions. In a specific embodiment, the storage medium could be a USB flash disk, an optical disk, a hard disk, etc., when the computer executable instructions stored in the storage medium are executed by a processor, the following processes could be realized:

acquiring ciphertext data sets sent by participating member nodes, where a ciphertext data set includes ciphertext service data, where the ciphertext service data is obtained by performing encryption on plaintext service data based on an encryption key array, and different participating member nodes use a same encryption key array, and where the participating member nodes include a first participating member node; performing data comparison on the ciphertext service data in the ciphertext data sets to obtain a data comparison result of the first participating member node.

In another specific embodiment, the storage medium could be a USB flash disk, an optical disk, a hard disk, etc., when the computer executable instructions stored in the storage medium are executed by a processor, the following processes could be realized:

encrypting plaintext service data based on an encryption key array to obtain a ciphertext data set, where the ciphertext data set includes ciphertext service data, and different participating member nodes use a same encryption key array;

sending the ciphertext data set to a central node; and acquiring a data comparison result generated by the central node, where the data comparison result is obtained by performing data comparison based on ciphertext service data in ciphertext data sets of the participating member nodes.

When the computer executable instructions stored in the storage medium according to the embodiment of the present application are executed by the processor, in one aspect, since ciphertext service data is obtained by encrypting with a same encryption key array, and if two pieces of ciphertext service data are the same, corresponding two pieces of plaintext service data are also the same, so a central node can directly compare ciphertext service data of different participating member nodes to obtain a data comparison result of a first participating member node, and based on the data comparison result, then a determination can be made on which same plaintext service data (i.e., common service data) is included between the participating member nodes, in this way, since the data comparison process is uniformly executed by the central node, service data will not be intercommunicated between the participating member nodes, and the central node directly performs data comparison based on the ciphertext service data without decrypting the ciphertext service data, so there is no need to acquire a corresponding data decryption key, that is, the service data in the data comparison process exists in a form of ciphertext, to ensure the security of service data in the whole data processing process. In another aspect, a data comparison result obtained by each participating member node from the central node could only contain data comparison sub-results related to respective ciphertext service data of the participating member node, for a case that the data comparison sub-results contain service data, the service data is also generated by the participating member node itself and exists in a form of ciphertext, in the whole data processing process, only the central node can acquire all ciphertext service data, since the central node cannot obtain a data decryption key, there is no need to add forged service data for the purpose of mixing-up, so the volume of ciphertext service data used in the data comparison process will not be increased, thereby improving the data processing efficiency of the whole process. In yet another aspect, since the data comparison result generated by the central node could include data comparison sub-results, and each data comparison result could include a correspondence relationship between any piece of ciphertext service data of the first participating member node and a plurality of second participating member nodes holding the ciphertext service data, rather than being specific to which common service data is held by a certain preset participating member node combination, therefore, the first participating member node could determine common service data of any designated participating member node combination based on the data comparison sub-results of the ciphertext service data (i.e., a data comparison result obtained by executing a data comparison task once), where the designated participating member node combination could include a node combination obtained from all combinations between the first participating member node and other participating member nodes, thus, the first participating member node could, according to actual requirements, determine which common service data is specifically contained for any participating member node combination expected to be known, to improve the flexibility of determining common service data and meet personalized requirements of different participating member nodes for determining common service data of any node combination.

It should be noted that the embodiment of the storage medium of the present application is based on a same inventive concept as the embodiment of the data processing method of the present application, so reference can be made to the implementation of the above-mentioned data processing method for a specific implementation of the present embodiment, and repetition parts will not be repeated here Specific embodiments of the present application have been described in the above. Other embodiments are within the scope of the appended claims. In some cases, actions or steps recited in the claims could be performed according to a different order from the embodiments and still achieve desired results. In addition, the processes described in the drawings do not necessarily require to show a specific order shown or a sequential order to achieve the desired results. In some embodiments, multitask processing and parallel processing are also possible or may be advantageous. It should be understood by those skilled in the art that embodiments of the present application could be provided as a method, a system or a computer program product. Therefore, embodiments of the present application could take a form of a complete hardware embodiment, a complete software embodiment, or an embodiment combining software and hardware aspects. Moreover, the present application could take a form of a computer program product implemented on one or more computer readable storage mediums (including but not limited to a disk storage, CD-ROM, an optical storage, etc.) containing computer usable program codes. The present application is described with reference to flowcharts and/or block diagrams of a method, a device (a system), and a computer program product according to embodiments of the present application. It should be understood that each flow and/or block in the flowcharts and/or block diagrams, and a combination of the flow and/or block in the flowchart and/or block diagram could be implemented by computer program instructions. These computer program instructions could be provided to a processor of a general-purpose computer, special-purpose computer, embedded processor or other programmable data processing apparatus to produce a machine, such that the instructions which are executed by the processor of the computer or other programmable data processing apparatus produce a device for realizing specified functions in one or more flows of the flowcharts and/or one or more blocks of the block diagrams.

These computer program instructions could also be stored in a computer readable memory that can guide a computer or other programmable data processing apparatus to work in a particular manner, so that the instructions stored in the computer readable memory produce a manufacture including an instruction apparatus, the instruction apparatus implements specified functions in one or more flowcharts and/or block diagrams. These computer program instructions could also be loaded onto a computer or other programmable data processing apparatus, such that a series of operational steps are performed on the computer or other programmable apparatus to produce a computer-implemented processing, so the instructions executed on the computer or other programmable apparatus provide steps for implementing the specified functions in one flow or multiple flows of the flowcharts and/or one block or multiple blocks of the block diagrams. In a typical configuration, a computing device includes one or more processors (CPU), input/output interfaces, network interfaces, and a memory. The memory could include a non-permanent memory, a random access memory (RAM) and/or a nonvolatile memory in the computer-readable medium, such as a read-only memory (ROM) or a flash memory. The memory is an example of the computer readable medium. The computer readable medium, including permanent and non-permanent, removable and non-removable media, could implement information storage by any methods or technologies. Information could be computer readable instructions, data structures, program modules or other data. Examples of storage media of the computer include, but not limited to, a phase change memory (PRAM), a static random access memory (SRAM), a dynamic random access memory (DRAM), a random access memory (RAM) of other types, a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette, a magnetic disk storage or other magnetic storage devices or any other non-transmission medium, which are used to store information that can be accessed by the computing device. According to the definition of this paper, the computer readable media do not include transitory computer-readable media (transitory media), such as modulated data signals and carrier waves.

It should also be noted that the terms "include", "contain" or any other variation thereof are intended to cover non-exclusive inclusion, so that a process, a method, a commodity or a device including a series of elements not only include those elements, but also other elements not explicitly listed, or elements inherent in such a process, a method, a commodity or a device. In a case of no more restrictions, an element defined by a statement "include a . . . " does not exclude other same elements existed in a process, a method, a commodity or a device including the elements. Embodiments of the present application could be described in the general context of computer executable instruction being executed by a computer, such as a program module. Generally, the program module includes a routine, a program, an object, a component, a data structure, etc. that perform a specific task or implement a specific abstract data type. One or more embodiments of the present application could also be practiced in distributed computing environments, in these distributed computing environments, a task is performed by a remote processing device that are connected through a communication network. In a distributed computing environment, the program module could be located in local and remote computer storage media including a storage device. Each embodiment of the present application is described in a progressive way, and only the same and similar parts between the embodiments could be referred to each other, and each embodiment focuses on differences from other embodiments. Especially, for a system embodiment, since it is basically similar to the method embodiment, the description is relatively simple, and relevant parts refer to a part of description of the method embodiment. The above description is only intended for embodiments of this document, and it is not used to limit this document. There are various modifications and variations in this document to those skilled in the art. Any modification, equivalent substitution, improvement, etc. made within the spirit and principle of this document shall be subject to the scope of the claims of this document.

What is claimed is:

1. A data processing method for determining common service data for a first participating member node in a communication network, applied to the first participating member node in the communication network, the communication network comprising a central node and participating member nodes, the participating member nodes comprising the first participating member node, wherein the central node is a terminal device or a server, and each of the participating member nodes is an electronic device; the method comprises:

encrypting plaintext service data based on an encryption key array to obtain a ciphertext data set of the first participating member node, wherein the ciphertext data set comprises ciphertext service data, and different participating member nodes use a same encryption key array, wherein the encryption key array contains m data encryption keys generated by m participating member nodes among n participating member nodes, m is an integer greater than 1 and less than or equal to n, n represents a number of the participating member nodes, and n is an integer greater than 1;

sending the ciphertext data set of the first participating member node to the central node; and acquiring a data comparison result of the first participating member node generated by the central node, wherein the data comparison result is obtained by performing data comparison based on ciphertext service data in ciphertext data sets of the participating member nodes;

wherein encrypting the plaintext service data based on the encryption key array to obtain the ciphertext data set of the first participating member node comprises:

determining the encryption key array containing the m data encryption keys, wherein the m participating member nodes are m key generation nodes of the m data encryption keys and comprise the first participating member node and a third participating member node; and determining the ciphertext data set of the first participating member node based on the encryption key array;

wherein determining the encryption key array containing the m data encryption keys comprises:

receiving a key generation instruction sent by the central node, wherein the key generation instruction is used to trigger the first participating member node to generate a data encryption key of the first participating member node and send the generated data encryption key to a fourth participating member node; and generating the data encryption key of the first participating member node in response to the key generation instruction and receiving a data encryption key of the third participating member node, to obtain the encryption key array.

2. The method according to claim 1, wherein the ciphertext data set of the first participating member node comprises a plurality of pieces of ciphertext service data, wherein the data comparison result comprises data comparison sub-results of the ciphertext service data of the first participating member node, and each of the data comparison sub-results corresponds to a piece of ciphertext service data of the first participating member node and is used to indicate a set of second participating member nodes holding the piece of ciphertext service data of the first participating member node;

wherein after acquiring the data comparison result generated by the central node, the method further comprises:

determining the common service data of a designated participating member node combination based on the data comparison sub-results, wherein the designated participating member node combination comprises the first participating member node and at least one fifth participating member node.

3. The method according to claim 1, wherein determining the ciphertext data set of the first participating member node based on the encryption key array comprises:

receiving a data encryption instruction sent by the central node, wherein the data encryption instruction is used to trigger the first participating member node to encrypt plaintext service data of the first participating member node based on the encryption key array to obtain ciphertext service data of the first participating member node; and in response to the data encryption instruction, determining the ciphertext data set of the first participating member node based on the encryption key array.

4. The method according to claim 1, wherein the ciphertext data set comprises user list ciphertext data, the user list ciphertext data comprises K pieces of ciphertext user information, and K is an integer greater than 1.

5. The method according to claim 1, wherein the ciphertext data set comprises commodity list ciphertext data, the commodity list ciphertext data comprises K pieces of ciphertext commodity information, and K is an integer greater than 1.

6. The method according to claim 1, wherein the encrypting plaintext service data based on an encryption key array to obtain a ciphertext data set of the first participating member node comprises:

taking the encryption key array as a whole, and obtaining the ciphertext service data by directly using the whole encryption key array to encrypt the plaintext service data; or taking each of the m data encryption keys in the encryption key array as a single encryption unit, and obtaining the ciphertext service data by encrypting plaintext service data based on the single encryption unit.

7. A non-transitory computer-readable storage medium configured to store computer executable instructions, wherein the computer executable instructions cause a computer to perform the method according to claim 1.

8. A data processing method for determining common service data for a first participating member node in a communication network, applied to a central node in the communication network, the communication network comprising the central node and participating member nodes, the participating member nodes comprising the first participating member node, wherein the central node is a terminal device or a server, and each of the participating member nodes is an electronic device; the method comprises:

acquiring ciphertext data sets sent by the participating member nodes, wherein each of the ciphertext data sets comprises ciphertext service data, the ciphertext service data is obtained by encrypting plaintext service data based on an encryption key array, and different participating member nodes use a same encryption key array; wherein the encryption key array contains m data encryption keys generated by m participating member nodes among n participating member nodes, m is an integer greater than 1 and less than or equal to n, n represents a number of the participating member nodes, and n is an integer greater than 1; and performing data comparison on the ciphertext service data in the ciphertext data sets of the participating member nodes to obtain a data comparison result of the first participating member node;

wherein acquiring the ciphertext data sets sent by the participating member nodes comprises:

determining the m participating member nodes of the n participating member nodes as key generation nodes, wherein the m key generation nodes comprise the first participating member node and a third participating member node;

sending a key generation instruction to each of the m key generation nodes, wherein the key generation instruction is used to trigger each of the key generation nodes to generate a data encryption key and send the data encryption key to a fourth participating member node, a set of data encryption keys generated respectively by the m key generation nodes constitutes the encryption key array; and acquiring the ciphertext data sets that are obtained by the n participating member nodes by encrypting according to the encryption key array.

9. The method according to claim 8, wherein a ciphertext data set of the first participating member node comprises a plurality of pieces of ciphertext service data, wherein performing the data comparison on the ciphertext service data in the ciphertext data sets of the participating member nodes to obtain the data comparison result of the first participating member node comprises:

performing the data comparison on the ciphertext service data in the ciphertext data sets of the participating member nodes to determine data comparison sub-results of the ciphertext service data of the first participating member node, wherein each of the data comparison sub-results corresponds to a piece of ciphertext service data of the first participating member node and is used to indicate a set of second participating member nodes holding the piece of ciphertext service data of ciphertext service data of the first participating member node; and obtaining the data comparison result of the first participating member node based on the data comparison sub-results.

10. The method according to claim 9, wherein each of the ciphertext data sets comprises K pieces of ciphertext service data, there are n ciphertext data sets of the participating member nodes, K is an integer greater than 1; and wherein performing the data comparison on the ciphertext service data in the ciphertext data sets of the participating member nodes to determine the data comparison sub-results of the ciphertext service data of the first participating member node comprises:

selecting ciphertext service data ready for comparison from the K pieces of ciphertext service data of the first participating member node;

determining node identifiers of the second participating member nodes according to data comparison on the ciphertext service data ready for comparison with the ciphertext service data in the n ciphertext data sets of the participating member nodes, wherein the second participating member nodes have the ciphertext service data ready for comparison; and generating a data comparison sub-result of the first participating member node according to the node identifiers of the second participating member nodes and the ciphertext service data ready for comparison.

11. The method according to claim 10, wherein determining each of the node identifiers of the second participating member nodes according to the data comparison on the ciphertext service data ready for comparison with the ciphertext service data in the n ciphertext data sets of the participating member nodes comprises:

determining whether a first comparison sub-result of the ciphertext service data ready for comparison exists in a set of historical comparison sub-results;

if the first comparison sub-result of the ciphertext service data ready for comparison exists in the set of historical comparison sub-results, determining, based on the first comparison sub-result, the node identifiers of the second participating member nodes having the ciphertext service data ready for comparison; and if the first comparison sub-result of the ciphertext service data ready for comparison does not exist in the set of historical comparison sub-results, determining the node identifiers of the second participating member nodes based on the data comparison on the ciphertext service data ready for comparison with the ciphertext service data in the n ciphertext data sets.

12. The method according to claim 8, wherein acquiring the ciphertext data sets that are obtained by the n participating member nodes by encrypting according to the encryption key array comprises:

in a case that the generation of the m data encryption keys is finished, sending a data encryption instruction to the n participating member nodes; wherein the data encryption instruction is used to trigger the participating member nodes to encrypt the plaintext service data of the participating member nodes based on the encryption key array to obtain the ciphertext service data; and acquiring the ciphertext data sets from the participating member nodes, wherein each of the ciphertext data sets contains K pieces of ciphertext service data.

13. The method according to claim 8, wherein determining the m participating member nodes of the n participating member nodes as the key generation nodes comprises:

determining, based on a data security level of a data processing task, a number of participating member nodes participating in key generation; and selecting the m participating member nodes from the n participating member nodes as the key generation nodes, based on the number of participating member nodes.

14. The method according to claim 8, wherein the sending a key generation instruction to each of the m key generation nodes comprises:

selecting one key generation node from the m key generation nodes in turn as a current sending object, sending the key generation instruction to the current sending object, and selecting a next current sending object from the m key generation nodes after receiving key generation succeeded feedback information returned by the current sending object, until each of the m key generation nodes are selected.

15. A data processing apparatus for determining common service data for a first participating member node in a communication network, arranged at a central node in the communication network, the communication network comprising the central node and participating member nodes, the participating member nodes comprising the first participating member node, wherein the central node is a terminal device or a server, and each of the participating member nodes is an electronic device; and the data processing apparatus comprises: a processor and a memory, wherein the memory is configured to store computer executable instructions, and the executable instructions are configured to be executed by the processor to implement the method according to claim 8.

16. A non-transitory computer-readable storage medium configured to store computer executable instructions, wherein the computer executable instructions cause a computer to perform the method according to claim 8.

17. A data processing apparatus for determining common service data for a first participating member node in a communication network, arranged at the first participating member node in the communication network, the communication network comprising a central node and participating member nodes, the participating member nodes comprising the first participating member node, wherein the central node is a terminal device or a server, and each of the participating member nodes is an electronic device; the apparatus comprises: a processor and a memory;

wherein the memory is configured to store computer executable instructions, and the executable instructions are configured to be executed by the processor to enable the processor to:

encrypt plaintext service data based on an encryption key array to obtain a ciphertext data set of the first participating member node, wherein the ciphertext data set comprises ciphertext service data, and different participating member nodes use a same encryption key array, wherein the encryption key array contains m data encryption keys generated by m participating member nodes among n participating member nodes, m is an integer greater than 1 and less than or equal to n, n represents a number of the participating member nodes, and n is an integer greater than 1;

send the ciphertext data set of the first participating member node to the central node; and acquire a data comparison result of the first participating member node generated by the central node, wherein the data comparison result is obtained by performing data comparison based on ciphertext service data in ciphertext data sets of the participating member nodes;

wherein when the processor executes the executable instructions to encrypt the plaintext service data based on the encryption key array to obtain the ciphertext data set of the first participating member node, the processor further executes the executable instructions to:

determine the encryption key array containing the m data encryption keys, wherein the m participating member nodes are m key generation nodes of the m data encryption keys and comprise the first participating member node and a third participating member node; and determine the ciphertext data set of the first participating member node based on the encryption key array;

wherein when the processor executes the executable instructions to determine the encryption key array containing the m data encryption keys, the processor further executes the executable instructions to:

receive a key generation instruction sent by the central node, wherein the key generation instruction is used to trigger the first participating member node to generate a data encryption key of the first participating member node and send the generated data encryption key to a fourth participating member node; and generate the data encryption key of the first participating member node in response to the key generation instruction and receiving a data encryption key of the third participating member node, to obtain the encryption key array.

* * * * *